(12) United States Patent
Guo et al.

(10) Patent No.: US 9,965,569 B2
(45) Date of Patent: May 8, 2018

(54) TRUNCATED AUTOSUGGEST ON A TOUCHSCREEN COMPUTING DEVICE

(71) Applicant: Microsoft Technology Licensing, LLC, Redmond, WA (US)

(72) Inventors: Qingwei Guo, Beijing (CN); Fangpeng Guo, Beijing (CN); Li Zhou, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 324 days.

(21) Appl. No.: 14/657,142

(22) Filed: Mar. 13, 2015

(65) Prior Publication Data

US 2016/0267200 A1    Sep. 15, 2016

(51) Int. Cl.
G06F 17/30 (2006.01)
G06F 3/01 (2006.01)
G06F 3/0488 (2013.01)
G06F 17/27 (2006.01)

(52) U.S. Cl.
CPC ........ *G06F 17/30973* (2013.01); *G06F 3/018* (2013.01); *G06F 3/0488* (2013.01); *G06F 17/276* (2013.01); *G06F 17/3064* (2013.01); *G06F 17/3097* (2013.01); *G06F 17/30864* (2013.01)

(58) Field of Classification Search
CPC .................. G06F 17/3064; G06F 17/3097
See application file for complete search history.

(56) References Cited

U.S. PATENT DOCUMENTS 7,996,589 B2   8/2011   Schultz et al.
8,423,545 B2   4/2013   Cort et al.
2007/0050352 A1*  3/2007  Kim ................... G06F 17/2223
2008/0147653 A1   6/2008  Collier
2010/0169341 A1   7/2010  Hu et al.
2011/0161311 A1*  6/2011  Mishne ............ G06F 17/30864
                                                  707/719

(Continued)

FOREIGN PATENT DOCUMENTS

WO   2014000267   1/2014
WO   2014032266   3/2014

OTHER PUBLICATIONS

Jiang, et al., "The Left and Right Context of a Word: Overlapping Chinese Syllable Word Segmentation with Minimal Context", In Journal of ACM Transactions on Asian Language Information Processing, vol. 12, Issue 1, Mar. 2013, 25 pages.

(Continued)

*Primary Examiner* — Hung Q Pham
(74) *Attorney, Agent, or Firm* — Merchant & Gould P.C.

(57) ABSTRACT

A computer device may reduce user error when constructing a search query. The computing device may display one or more search terms within a search box based on user input. The computing device may display initial autosuggest candidates and detect a user-selected initial autosuggest candidate. The computing device may display the user-selected initial autosuggest candidate within the search box as a preliminary search query, without automatically initiating a web search for the preliminary search query. The computing device may receive new autosuggest candidates having the preliminary search query as a common prefix, generate truncated autosuggest candidates by removing the common prefix from each new autosuggest candidate, and display the truncated autosuggest candidates.

20 Claims, 11 Drawing Sheets

(56) References Cited

U.S. PATENT DOCUMENTS

| | | | |
|---|---|---|---|
| 2011/0184719 A1 | 7/2011 | Christ | |
| 2012/0246153 A1* | 9/2012 | Pehle | G06F 17/30864 707/723 |
| 2012/0246165 A1 | 9/2012 | Batraski et al. | |
| 2013/0041878 A1* | 2/2013 | Satyanarayana | G06F 17/3097 707/706 |
| 2013/0046777 A1 | 2/2013 | Mohiuddin et al. | |
| 2014/0136543 A1 | 5/2014 | Frieden et al. | |
| 2014/0181692 A1 | 6/2014 | Gupta | |
| 2014/0207748 A1 | 7/2014 | Sood et al. | |
| 2014/0253458 A1 | 9/2014 | Patel | |

OTHER PUBLICATIONS

"YoloTM-User Guide", Retrieved on: Oct. 13, 2014 Available at: http://www.intel.in/content/dam/www/public/us/en/documents/guides/yolo-user-guide.pdf, 54 pages.

Jiang, et al., "An Automated Evaluation Metric for Chinese Text Entry", In Proceedings of the Computing Research Repository, Apr. 2007, 8 pages.

Nudelman, Greg, "Mobile Auto-Suggest on Steroids: Tap-Ahead Design Pattern", Published on: Apr. 27, 2011 Available at: http://www.smashingmagazine.com/2011/04/27/tap-ahead-design-pattern-mobile-auto-suggest-on-steroids/?utm_source=twitterfeed &utm_medium=twitter, 12 pages.

Davies, Jason, "New In Summer 2013: Auto-Suggest for Mobile Access Quick Search", Published on: Jul. 11, 2013, Available at: http://www.maximizer.com/blog/new-in-summer-2013-auto-suggest-for-mobile-access-quick-search/, 7 pages.

PCT International Search Report in PCT/US2016/000355, dated Sep. 7, 2016, 11 pages.

"Second Written Opinion Issued in PCT Application No. PCT/IB2016/000355", dated: Feb. 3, 2017, 7 Pages.

"International Preliminary Report on Patentability Issued in PCT Application No. PCT/IB2016/000355", dated: May 24, 2017, 8 Pages.

* cited by examiner

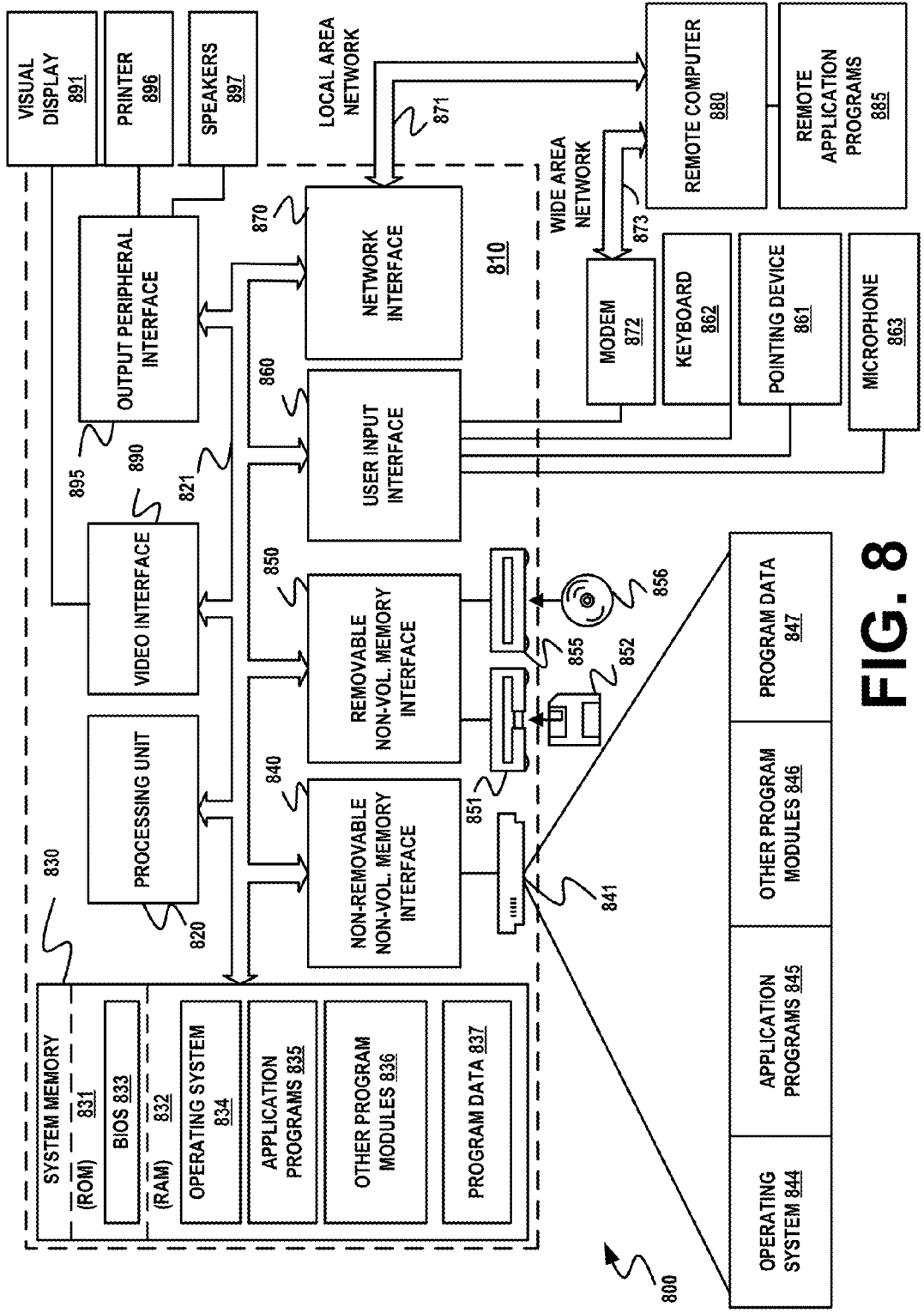

TRUNCATED AUTOSUGGEST ON A TOUCHSCREEN COMPUTING DEVICE

BACKGROUND

A search engine can include an autosuggest feature that provides suggested queries as a user inputs text into a search box. For example, the most popular phrases that start with the same characters as the text input into the search box can be displayed as separate rows within a drop-down list. When using a physical keyboard, a user can make a selection from the drop-down list using directional keys to move a suggested query to the search box and then can hit an enter key to perform a web search. Alternatively, the user may initiate a web search by using a mouse to click a suggested query in the drop-down list.

On a touchscreen computing device, a drop-down list of suggested queries may be presented in response to a user inputting text into a search box using an on-screen virtual keyboard. When the user taps a suggested query in the drop-down list displayed on the touchscreen computing device, the suggested query is moved to the search box and a web search is automatically initiated to display search results including links to relevant web pages. When displayed on a touchscreen computing device, a drop-down list of suggested queries may include arrow or plus symbol (+) icons that are presented at the far right of each row and that move a corresponding suggested query to the search box without automatically performing a web search when touched.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, a computing device may reduce user error when constructing a search query. The computing device may display one or more search terms within a search box based on user input. The computing device may display initial autosuggest candidates and detect a user-selected initial autosuggest candidate. The computing device may display the user-selected initial autosuggest candidate within the search box as a preliminary search query, without automatically initiating a web search for the preliminary search query. The computing device may receive new autosuggest candidates having the preliminary search query as a common prefix, generate truncated autosuggest candidates by removing the common prefix from each new autosuggest candidate, and display the truncated autosuggest candidates.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

FIG. 8 illustrates an embodiment of an exemplary computing environment that may implement aspects of the described subject matter.

DETAILED DESCRIPTION

Figure 1A:
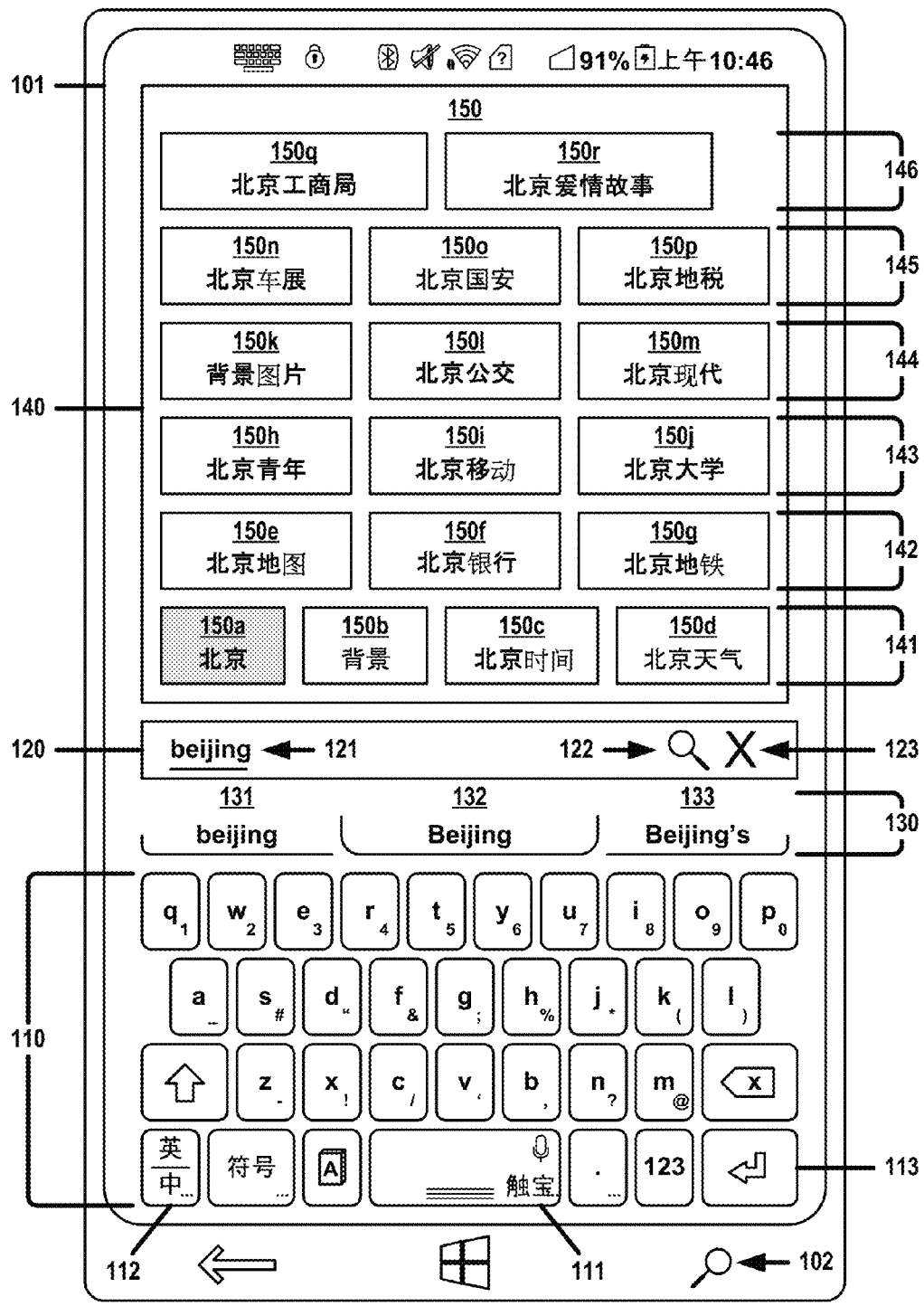
FIGS. 1A-D illustrate an embodiment of an exemplary computing device that may implement aspects of the described subject matter.

The detailed description provided below in connection with the appended drawings is intended as a description of examples and is not intended to represent the only forms in which the present examples may be constructed or utilized. The description sets forth functions of the examples and sequences of steps for constructing and operating the examples. However, the same or equivalent functions and sequences may be accomplished by different examples.

References to "one embodiment," "an embodiment," "an example embodiment," "one implementation," "an implementation," "one example," "an example" and the like, indicate that the described embodiment, implementation or example may include a particular feature, structure or characteristic, but every embodiment, implementation or example may not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic may be implemented in connection with other embodiments, implementations or examples whether or not explicitly described.

Numerous specific details are set forth in order to provide a thorough understanding of one or more aspects of the described subject matter. It is to be appreciated, however, that such aspects may be practiced without these specific details. While certain components are shown in block diagram form to describe one or more aspects, it is to be understood that functionality performed by a single component may be performed by multiple components. Similarly, a single component may be configured to perform functionality described as being performed by multiple components.

Various aspects of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

FIGS. 1A-D illustrate a computing device 100 as an embodiment of an exemplary computing device that may implement aspects of the described subject matter. Computing device 100 may include a combination of hardware and software in various embodiments. In general, computing device 100 may include one or more processors and storage devices (e.g., memory and disk drives) as well as various input devices, output devices, communication interfaces, and/or other types of devices. It can be appreciated that various types of computer-readable storage media (e.g., memory and/or additional hardware storage) may be part of computing device 100. As used herein, the terms "computer-readable storage media" and "computer-readable storage medium" do not mean and unequivocally exclude a propagated signal, a modulated data signal, a carrier wave, or any other type of transitory computer-readable medium.

Computer-executable instructions may be stored on one or more computer-readable storage media and may be executed by one or more processors, computing devices, and/or computer systems to perform particular tasks or implement particular data types in accordance with aspects of the described subject matter. In various implementations, computing device 100 may include a computer-readable storage medium (e.g., memory and/or additional hardware storage) storing computer-executable instructions configured to perform various steps, methods, and/or functionality in accordance with aspects of the described subject matter and a processor for executing such computer-executable instructions. It can be appreciated that computer-executable instructions may be embodied and/or implemented in various ways such as by a computer program (e.g., client program and/or server program), a software application (e.g., client application and/or server application), software code, application code, source code, executable files, executable components, program modules, routines, application programming interfaces (APIs), functions, methods, objects, properties, data structures, data types, and/or the like.

As shown, computing device 100 may be implemented by a touch-screen computing device such as a smartphone. It is to be appreciated that computing device 100 may be implemented by various types of mobile or stationary computing devices such as a tablet device, a laptop computer, a media player, a gaming device, a vehicle computer, a wearable computing device, a desktop computer, and/or other suitable type of client-side computing device.

Computing device 100 may display a user interface 101 for allowing a user to construct and submit a search query. User interface 101 may be presented by a web browsing application or other suitable type of application, application program, and/or app that provides a search interface. In various scenarios, user interface 101 may be presented after launching an application (e.g., web browser, search engine app, etc.) and/or after presenting a web page (e.g., search engine web page) or other search interface.

Computing device 100 and user interface 101 may be configured to receive and respond to various types of user input. As shown in FIG. 1A, for instance, user interface 101 may be presented on a touchscreen of computing device 100 and may include an on-screen virtual keyboard 110 configured to receive touch input. Computing device 100 also may include hardware and software for providing speech recognition and/or handwriting recognition. Computing device 100 and/or user interface 101 may provide various mechanisms for switching among different types of user input. For example, virtual keyboard 110 may include a spacebar 111 that provides options for selecting voice input and/or handwriting input.

Computing device 100 and user interface 101 may support receiving typed, spoken and/or handwritten user input supplied in different languages. In various implementations, computing device 100 and user interface 101 may receive and respond to user input that is typed or handwritten using Latin and/or non-Latin (e.g., Chinese, Japanese, Korean, Vietnamese, Indic, etc.) characters. As shown in FIG. 1A, for instance, virtual keyboard 110 may include a language button 112 for switching between English and Chinese keyboards and/or input modes. As shown, virtual keyboard 110 may be presented with keys having Latin characters and non-Latin characters.

User interface 101 may include a search box 120 configured to display one or more search terms based on user input. As shown in FIG. 1A, for instance, search box 120 may display a search term 121 (e.g., beijing) in response to one or more types of user input. In various implementations, search term 121 may be displayed within search box 120 in response to a user typing on virtual keyboard 110. Alternatively or additionally, a user may provide user input by speaking or handwriting one or more words, which are then processed using speech recognition or handwriting recognition for display within search box 120. Touching search term 121 in search box 120 may allow a user to edit search term 121 and provide functionality for selecting a word, displaying insertion pointer at a touch point, and/or pasting a copied word.

Search box 120 may include a search button 122 for initiating a web search and a delete button 123 for removing a displayed search query. In addition to touching search button 122, a user also may initiate a web search by touching an enter key 113 on virtual keyboard 110 or by pressing a physical search button 102 on computing device 100. In general, initiating a web search would result in delivery of search engine results pages (SERPs) including links to web pages that are relevant to search term 121. Requiring the user to take action to initiate a web search reduces the likelihood that the user accidentally or prematurely performs a web search before constructing a completed search query. Accordingly, user error can be avoided and processing resources of computing device 100 and/or a remote computer system (e.g., search engine, web service, cloud-based service, etc.) can be conserved.

In some implementations, computing device 100 may include and/or run an input method editor (IME) that supports different languages, and user interface 110 may present a set of IME candidates 130 in response to user input. The set of IME candidates 130 may be displayed using Latin characters or non-Latin characters depending on which language (e.g., English or Chinese) is enabled or selected for the IME. The set of IME candidates 130 may be presented as a user types and may be provided locally by computing device 100 via the IME. As shown in FIG. 1A, for instance, IME candidates 131-133 (e.g., Beijing, Beijing, and Beijing's) may be provided using Latin characters in response to a user typing Latin characters for search term 121 (e.g., beijing) via virtual keyboard 110. A user may touch one of IME candidates 131-133 to move a selected word or phrase to search box 120. When touched, one of IME candidates 131-133 may replace search term 121 within search box 120 without automatically initiating a web search.

IME or IME-like functionality such as input mapping also may be provided in conjunction with and/or by search box 120. For example, search box 120 may be configured to receive and interpret keystrokes of virtual keyboard 110 according to input methods for various supported language. Such input methods for languages may include phonetic-based input methods that allow a user to type Latin characters to represent the pronunciation of a word and/or shape-based input methods that allow a user to type Latin characters to represent strokes or shape of a word. Exemplary input methods for a language include, without limitation: a Chinese input method (e.g., Pinyin, Zhuyin, Wubi, etc.), a Japanese input method (e.g., Romaji, Hiragana, Katakana), Korean input method (e.g., Hangul, Hanja, etc.), Vietnamese input method (e.g., Telex, VNI, VIQR), an Indic input method (e.g., BhashaIndia, etc.), and/or other input method for a supported language. For instance, Latin characters for search term 121 (e.g., beijing) may be input via virtual keyboard 110 (e.g., QWERTY keyboard) and may be received and interpreted as input method characters (e.g., Pinyin characters). Such IME functionality may be provided by an IME or IME-like program or operating system component that runs in conjunction with an application that presents user interface 101, by user interface 101, and/or by an application that presents user interface 101.

Initial Autosuggest Candidates

In response to entry of search term 121 (e.g., beijing) in search box 120, an autosuggest window 140 may be displayed in user interface 101. It can be appreciated that autosuggest window 140 also may be displayed if IME candidate 131 (e.g., beijing) is selected and moved to search box 120. Autosuggest window 140 may be implemented in various ways such as a pop-up list, a drop-down list, a pop-up window, frame, and/or other suitable display region presented in proximity and/or attached to search box 120.

As shown, autosuggest window 140 includes several rows 141-146 for presenting a set of initial autosuggest candidates 150. The number of rows 141-146 may be greater than the number of rows (e.g., 4 or 5) that is typically provided by a drop-down list on a mobile computing device where the screen size is small and consumed in part by virtual keyboard 110. It can be appreciated that the number of rows 141-146 presented by autosuggest window 140 may vary based on the number of autosuggest candidates included in the set of initial autosuggest candidates 150, the lengths of the autosuggest candidates included in the set of initial autosuggest candidates 150, and/or other design considerations.

Computing device 100 may receive the set of initial autosuggest candidates 150 from a remote computer system that implements a search engine and/or other web service (e.g., cloud-based service) having autosuggest functionality. Computing device 100 may receive the set of initial autosuggest candidates 150 from the remote computer system over a network or combination of networks. Exemplary networks include, without limitation: a wide area network (WAN) such as the Internet, a local area network (LAN), a private network, a public network, a packet network, a circuit-switched network, a wired network, and/or a wireless network. Computing device 100 may communicate with the remote computer system using various communication protocols such as Internet communication protocols, WAN communication protocols, LAN communications protocols, and/or other network communication protocols.

In various implementations, computing device 100 may submit one or more web requests (e.g., HTTP requests) for search term 121 when or as the user types, speaks, and/or handwrites one or more words. The set of initial autosuggest candidates 150 may be received and change when or as the user inputs or edits different words. A remote computer system (e.g., a search engine and/or other web service having autosuggest functionality) may provide the set of initial autosuggest candidates 150 from an autosuggest dictionary or other repository of words and phrases that map to characters and/or words of search term 121. It is to be understood that the set of initial autosuggest candidates 150 does not include and is to be distinguished from SERPs provided by a search engine in response to initiating a web search for search term 121.

In the exemplary implementation shown in FIG. 1A, the set of initial autosuggest candidates 150 includes: autosuggest candidate 北京 (Beijing) 150a, autosuggest candidate 背景 (background) 150b, autosuggest candidate 北京时间 (Beijing time) 150c, autosuggest candidate 北京天气 (Beijing weather) 150d, autosuggest candidate 北京地图 (Beijing maps) 150e, autosuggest candidate 北京银行 (Beijing bank) 150f, autosuggest candidate 北京地铁 (Beijing subway) 150g, autosuggest candidate 北京青年 (Beijing youth) 150h, autosuggest candidate 北京移动 (Beijing mobile) 150i, autosuggest candidate 北京大学 (Beijing University) 150j, autosuggest candidate 背景图片 (background images) 150k, autosuggest candidate 北京公交 (Beijing bus) 150l, autosuggest candidate 北京现代 (Beijing Hyundai) 150m, autosuggest candidate 北京车展 (Beijing auto show) 150n, autosuggest candidate 北京国安 (Beijing Guoan soccer club) 150o, autosuggest candidate 北京地税 (Beijing Municipal Bureau of Local Taxation) 150p, autosuggest candidate 北京工商局 (Beijing Industry and Commerce Bureau) 150q, and autosuggest candidate 北京爱情故事 (Beijing Love Story) 150r.

In this implementation, search term 121 may be provided using one type of characters (e.g., Latin characters, input method characters) and/or in one language (e.g., English), and the set of initial autosuggest candidates 150 may be displayed using a different type of characters (e.g., non-Latin characters, transliterated characters) and/or in a different language (e.g., Chinese). In some implementations, the set of initial autosuggest candidates 150 may include one or more autosuggest candidates that are displayed using the same type of Latin or non-Latin characters and/or in the same language as supplied for search term 121 and one or more autosuggest candidates that are displayed using a different type of characters and/or in a different language as supplied for search term 121. Additionally, the set of initial autosuggest candidates 150 may include autosuggest candidates displayed in multiple different languages and using the Latin or non-Latin characters appropriate for such different languages. In another implementation, the set of initial autosuggest candidates 150 may be displayed in the same language and/or using the same type of characters (e.g., Latin or non-Latin) as supplied for search term 121. In particular, such implementation may display search terms and/or search queries only in English using Latin characters and provide autosuggest candidates only in English using Latin characters. Default settings and/or user preferences may control how user input is interpreted and/or the language(s) for displaying the set of initial autosuggest candidates 150.

In various implementations, the set of initial autosuggest candidates 150 may include one or more translations of search term 121 into a different language, such as from English to Chinese. Likewise, the set of initial autosuggest candidates 150 may include one or more conversions of search term 121 into a different type of characters, such as from Latin characters to non-Latin characters and/or from input method characters (e.g., Pinyin characters) to transliterated characters (e.g., Chinese characters). As shown in FIG. 1A, for instance, the set of initial autosuggest candidates 150 includes autosuggest candidate 北京 (Beijing) 150a as a primary (e.g., most likely, most common, most popular, etc.) translation or conversion of search term 121. The set of initial autosuggest candidates 150 also includes autosuggest candidate 背景 (background) 150b as a secondary translation or conversion. In this case, autosuggest candidate 背景 (background) 150b is a translated or transliterated word having a pronunciation that is phonetically similar to the pronounced translation of search term 121. Additional and/or alternative types of secondary translations or conversions may be provided, such as words or phrases having a meaning or context related to search term 121 as well as other common translations or conversions of search term 121.

The set of initial autosuggest candidates 150 also may include one or more autosuggest candidates that are provided based on another autosuggest candidate, such as a translation or conversion of search term 121. For instance, autosuggest candidates 150c-150j and 150l-150r may be provided based on autosuggest candidate 北京 (Beijing) 150a and may include phrases that begin with the same characters as autosuggest candidate 北京 (Beijing) 150a. Likewise, autosuggest candidate 背景图片 (background images) 150k may be a phrase that begins with and is provided based on autosuggest candidate 背景 (background) 150b. The set of initial autosuggest candidates 150 is not limited to phrases beginning with a single search term 121 (or its conversion) and, therefore, provides a more diverse selection of autosuggest candidates.

Phrases that begin with a translation or conversion of search term 121 may be automatically suggested and provided by a remote computer system (e.g., search engine and/or other web service having autosuggest functionality) based on relevance and/or popularity among a community of users over a certain period of time. Alternatively or additionally, such phrases may be based on various types of user-related data such as past searches conducted by the user, a geographic location of computing device 100, user preferences, a user profile (e.g., a device profile, a computer program profile, a website profile, a usage profile, etc.), and/or other factors pertaining to relevance.

In implementations where user-related data is utilized, providers (e.g., computing device 100, application, etc.) and consumers (e.g., remote computer system, search engine, web service, cloud-based service, etc.) of such user-related data may employ a variety of mechanisms in the interests of user privacy and information protection. Such mechanisms may include, without limitation: requiring authorization to monitor, collect, or report data; enabling users to opt in and opt out of data monitoring, collecting, and reporting; employing privacy rules to prevent certain data from being monitored, collected, or reported; providing functionality for anonymizing, truncating, or obfuscating sensitive data which is permitted to be monitored, collected, or reported; employing data retention policies for protecting and purging data; and so forth.

In various implementations, computing device 100 may receive the set of initial autosuggest candidates 150 as a ranked listing of autosuggest candidates 150a-150r. The ranking or scoring of autosuggest candidates 150a-150r may be based on relevance, popularity, time, user-related data, and/or factors pertaining to search term 121. The set of initial autosuggest candidates 150 also may be accompanied by metadata that includes a rank or score for each of autosuggest candidates 150a-150r and/or that indicates a length of each of autosuggest candidates 150a-150r.

The ranked listing may include other autosuggest candidates in addition to autosuggest candidates 150a-150r. For instance, the ranked listing may include more autosuggest candidates than can fit within autosuggest window 140 and/or certain autosuggest candidates that ultimately are not selected for display. In some cases, one or more autosuggest candidates from the ranked listing may be skipped (not selected for display) to increase the diversity of the set of initial autosuggest candidates 150 displayed in autosuggest window 140. For example, if autosuggest candidate 北京天气 (Beijing weather) 150d is selected for display from the ranked listing, a narrower phrase such as 北京天气预报 (Beijing weather forecast) may be skipped in the ranked listing so that autosuggest candidates 150a-150r are diverse phrases that end with different words.

As shown in FIG. 1A, autosuggest candidates 150a-150r may be arranged within rows 141-146 of autosuggest window 140. In various implementations, one or more of rows 141-146 of autosuggest window 140 may include multiple autosuggest candidates. For instance, row 141 may include autosuggest candidates 150a-150d displayed adjacent to search box 120. Autosuggest window 140 is not limited to one autosuggest candidate per row and, therefore, provides more autosuggest candidates for selection by the user, increases the likelihood that a particular autosuggest candidate of interest to the user will be displayed and touched, and reduces the need for further typing via virtual keyboard 110, which is prone to user error.

Computing device 100, user interface 101, and/or an application that presents user interface 101 may include presentation logic and/or code for selecting autosuggest candidates 150a-150r for display and/or arranging autosuggest candidates 150a-150r within rows 141-146 of autosuggest window 140. Autosuggest candidates 150a-150r may be arranged within rows 141-146 of autosuggest window 140 based on the rank and/or length of each of autosuggest candidates 150a-150r. In the implementation shown in FIG. 1A, shorter autosuggest candidates (e.g., autosuggest candidates 150a-150d) may be displayed at the bottom of autosuggest window 140 and/or adjacent to search box 120, and longer autosuggest candidates (e.g., autosuggest candidates 150q and 150r) may be displayed at the top of autosuggest window 140. In other implementations, shorter autosuggest candidates may be displayed at the top of autosuggest window 140, and longer autosuggest candidates may be displayed at the bottom of autosuggest window 140.

In various implementations, autosuggest candidates may be selected and/or arranged to maximize the number of autosuggest candidates displayed in autosuggest window 140. Shorter autosuggest candidate may be grouped and/or arranged within a particular row to optimally utilize the available slots for autosuggest candidates. When a slot for an autosuggest candidate is available after a certain number of ranked autosuggest candidates have been selected for display, the next most relevant autosuggest candidate having a length which fits in the slot may be selected for display.

Upon display of the set of initial autosuggest candidates 150 in autosuggest window 140, one of autosuggest candidates 150a-150r may be selected by the user. Computing device 100, user interface 101, and/or an application that displays user interface 101 may be configured to detect and respond to the touching of autosuggest candidates 150a-150r within rows 141-146 of autosuggest window 140. In the implementation shown in FIG. 1A, for instance, the user may touch autosuggest candidate 北京 (Beijing) 150a in row 141. In this example, the user-selected autosuggest candidate (e.g., autosuggest candidate 北京 (Beijing) 150a) may be the primary translation or conversion of search term 121 (e.g., beijing) displayed using transliterated non-Latin (e.g., Chinese) characters.

Truncated Autosuggest Candidates

Figure 1B:
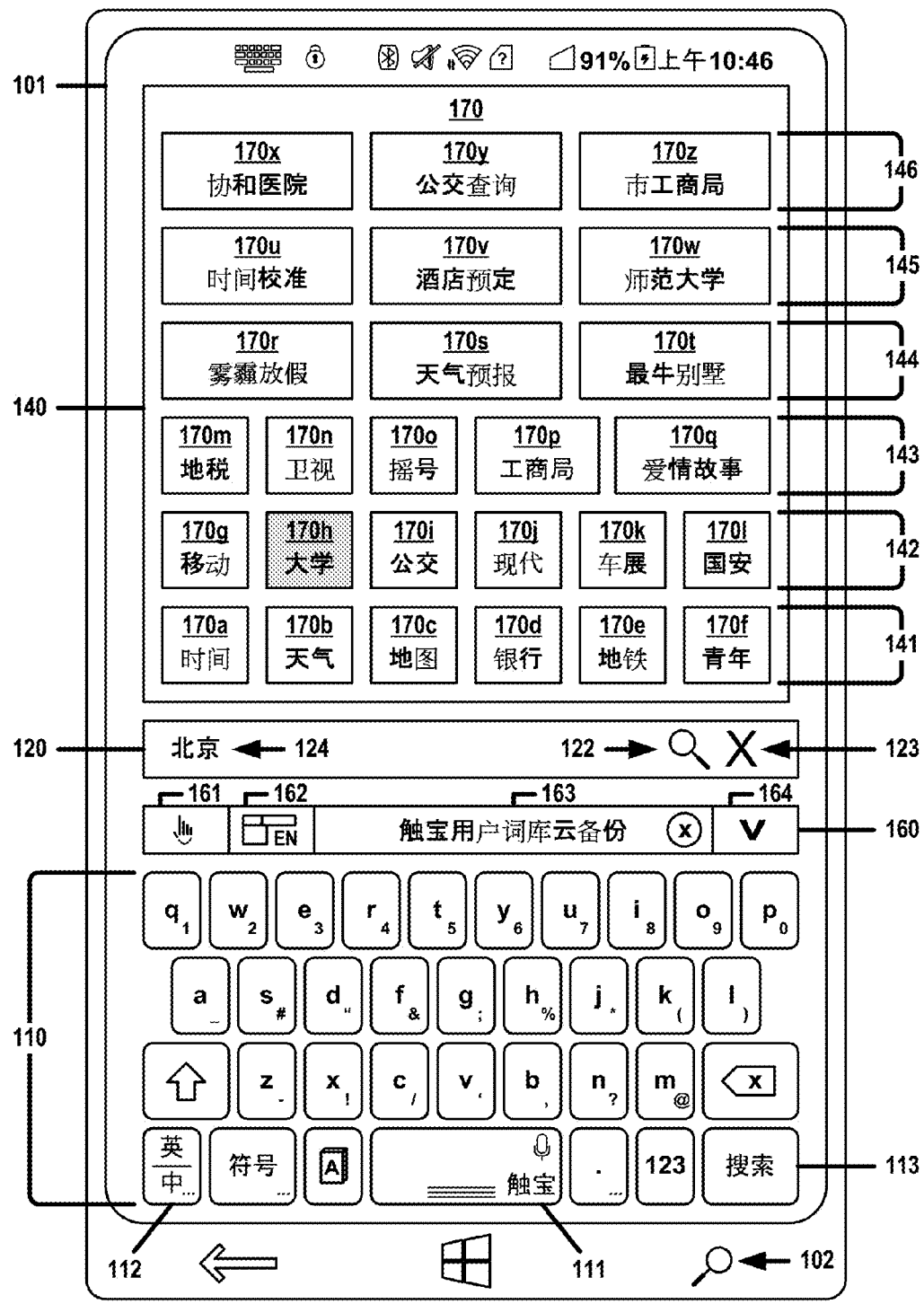

Referring to FIG. 1B with continuing reference to the foregoing figure, user interface 101 may display a user-selected autosuggest suggest candidate (e.g., autosuggest candidate 北京 (Beijing) 150a) within search box 120 as a preliminary search query 124. For instance, when touched in autosuggest window 140, autosuggest candidate 北京 (Beijing) 150a may be detected and moved to search box 120. Preliminary search query 124 (e.g., 北 京) may replace search term 121 and may be displayed within search box 120 without automatically initiating a web search for preliminary search query 124. In order to initiate a web search for preliminary search query 124, the user may touch search button 122, enter key 113 (which may be relabeled as a 搜索 (search for) key), or physical search button 102. Requiring the user to take action to initiate a web search reduces the likelihood that the user accidentally or prematurely performs a web search before constructing a completed search query. Accordingly, user error can be avoided and processing resources of computing device 100 and/or a remote computer system (e.g., search engine, web service, cloud-based service, etc.) can be conserved.

In some implementations, user interface 101 may display an IME command bar 160 that provides additional functionality. As shown in FIG. 1B, for instance, IME command bar 160 may include: a handwriting button 161 for selecting handwriting input, a keyboard button 162 for switching between English and Chinese keyboards, a 触宝用户词库云备份 (User Word Library Cloud Backup) button 163 for storing preliminary search query 124 in cloud storage, and an options button 164 for displaying further selections and/or IME candidates based on preliminary search query 124.

When a particular autosuggest candidate (e.g., autosuggest candidate 北京 (Beijing) 150a) is selected in autosuggest window 140, computing device 100 may receive new autosuggest candidates. In various implementations, computing device 100 may submit one or more web requests (e.g., HTTP requests) for preliminary search query 124 and receive new autosuggest candidates based on preliminary search query 124 from a remote computer system (e.g., search engine and/or other web service having autosuggest functionality) over a network or combination of networks. The remote computer system may provide the new autosuggest candidates from an autosuggest dictionary or other repository of words and phrases that map to characters and/or words of preliminary search query 124. It is to be understood that the new autosuggest candidates do not include and are to be distinguished from SERPs provided by a search engine in response to initiating a web search for preliminary search query 124.

In the exemplary implementation shown in FIG. 1B, the new autosuggest candidates based on preliminary search query 124 (e.g., 北京) may include: 北京时间 (Beijing time), 北京天气 (Beijing weather), 北京地图 (Beijing maps), 北京银行 (Beijing bank), 北京银行 (Beijing subway), 北京青年 (Beijing youth), 北京移动 (Beijing mobile), 北京大学 (Beijing University), 北京车展 (Beijing bus), 北京公交 (Beijing Hyundai), 北京现代 (Beijing auto show), 北京国安 (Beijing Guoan soccer club), 北京地税 (Beijing Municipal Bureau of Local Taxation), 北京电视 (Beijing television), 北京摇号 (Beijing lottery), 北京工商局 (Beijing Industry and Commerce Bureau), 北京爱情故事 (Beijing Love Story), 北京雾霾放假 (Beijing smog/haze holiday), 北京天气预报 (Beijing weather forecast), 北京最牛别墅 (Beijing best villa), 北京时间校准 (Beijing time adjustment/offset), 北京酒店预定 (Beijing hotel booking), 北京师范大学 (Beijing Normal University), 北京协和医院 (Beijing Union Hospital), 北京公交查询 (Beijing bus inquiry), and 北京市工商局 (Beijing Municipal Industry and Commerce Bureau).

The new autosuggest candidates for preliminary search query 124 may be automatically suggested and provided by a remote computer system (e.g., search engine and/or other web service having autosuggest functionality) based on relevance and/or popularity among a community of users over a certain period of time. Alternatively or additionally, the new autosuggest candidates for preliminary search query 124 may be based various types of user-related data (e.g. past searches conducted by the user, a geographic location of computing device 100, user preferences, a user profile) and/or other factors pertaining to relevance. In implementations where user-related data is utilized, providers (e.g., computing device 100, application, etc.) and consumers (e.g., remote computer system, search engine, web service, cloud-based service, etc.) of such user-related data may employ a variety of mechanisms in the interests of user privacy and information protection, as described above.

In various implementations, computing device 100 may receive a ranked listing of the new autosuggest candidates for preliminary search query 124. The new autosuggest candidates may be ranked or scored based on relevance, popularity, time, user-related data, and/or other factors pertaining to preliminary search query 124. The new autosuggest candidates also may be accompanied by metadata that includes a rank or score for each new autosuggest candidate. The ranked listing of new autosuggest candidates may include more autosuggest candidates than can fit within autosuggest window 140 and/or certain new autosuggest candidates that ultimately are not selected for display.

In one implementation, preliminary search query 124 and the new autosuggest candidates may be provided using the same type of characters (e.g., non-Latin characters, transliterated characters) and/or in the same language (e.g., Chinese). In some implementations, the new autosuggest candidates may include one or more autosuggest candidates that are provided using the same type of characters (e.g., non-Latin characters, transliterated characters) and/or in the same language (e.g., Chinese) as supplied for preliminary search query 124 and one or more new autosuggest candidates that are provided using a different type of characters (e.g., Latin characters) and/or in a different language (e.g., English) as supplied for preliminary search query 124. Additionally, the new autosuggest candidates may include autosuggest candidates provided in multiple different languages using the Latin or non-Latin characters appropriate for such different languages. Default settings and/or user preferences may control how preliminary search query 124 is interpreted and/or the language(s) for providing the new autosuggest candidates.

In some cases, the new autosuggest candidates for preliminary search query 124 may be provided as a set of new autosuggest candidates, and each new autosuggest candidate in the set may include preliminary search query 124 (e.g., 北京) as a common prefix. For instance, each new autosuggest candidate in the set may be a phrase that begins with the same characters as preliminary search query 124. In other cases, the new autosuggest candidates provided for preliminary search query 124 may be parsed and/or filtered to compose a set of new autosuggest candidates containing only new autosuggest candidates that include preliminary search query 124 as a common prefix. Additionally, certain new autosuggest candidates that include preliminary search query 124 as a common prefix may be excluded from the set to increase the diversity of the new autosuggest candidates. For example, since the phrase 北京工商局 (Beijing Industry and Commerce Bureau) is provided as a new autosuggest candidate, the narrower phrase 北京市工商局 (Beijing Municipal Industry and Commerce Bureau) could be excluded from the set and replaced by another phrase that includes the common prefix 北京 (Beijing) followed by one or more different words.

In various implementations, a set of truncated autosuggest candidates 170 may be generated by removing the common prefix (e.g., 北京, preliminary search query 124) from each new autosuggest candidate. For instance, the common prefix 北京 may be identified and extracted from each new autosuggest candidate at the character and/or word level. By removing the common prefix, the length of each new autosuggest candidate is shortened and less space is required to display the set of truncated autosuggest candidates 170. In addition, the set of truncated autosuggest candidates 170 will be composed of shorter and more concise phrases to facilitate reading and reviewing by the user. Computing device 100, user interface 101, and/or an application that presents user interface 101 may include logic and/or code for generating the set of truncated autosuggest candidates 170 from new autosuggest candidates provided by a remote computer system (e.g., search engine and/or other web service having autosuggest functionality). Alternatively, computing device 100 may receive the set of truncated autosuggest candidates 170 from the remote computer system, which may be configured to generate and provide the set of truncated autosuggest candidates 170 in response to preliminary search query 124.

In the exemplary implementation shown in FIG. 1B, the set of truncated autosuggest candidates 170 based on preliminary search query 124 includes: truncated autosuggest candidate 时间 (time) 170*a*, truncated autosuggest candidate 天气 (weather) 170*b*, truncated autosuggest candidate 地图 (maps) 170*c*, truncated autosuggest candidate 银行 (bank) 170*d*, truncated autosuggest candidate 地铁 (subway) 170*e*, truncated autosuggest candidate 青年 (youth) 170*f*, truncated autosuggest candidate 移动 (mobile) 170*g*, truncated autosuggest candidate 大学 (university) 170*h*, truncated autosuggest candidate 公交 (bus) 170*i*, truncated autosuggest candidate 现代 (Hyundai) 170*j*, truncated autosuggest candidate 车展 (auto show) 170*k*, truncated autosuggest candidate 国安 (Guoan soccer club) 170*l*, truncated autosuggest candidate 地税 (Municipal Bureau of Local Taxation) 170*m*, truncated autosuggest candidate 卫视 (television) 170*n*, truncated autosuggest candidate 摇号 (lottery) 170*o*, truncated autosuggest candidate 工商局 (Industry and Commerce Bureau) 170*p*, truncated autosuggest candidate 爱情故事 (Love Story) 170*q*, truncated autosuggest candidate 雾霾放假 (smog/haze holiday) 170*r*, truncated autosuggest candidate 天气预报 (weather forecast) 170*s*, truncated autosuggest candidate 最牛别墅 JR (best villa) 170*t*, truncated autosuggest candidate 时间校准 (time adjustment/offset) 170*u*, truncated autosuggest candidate 酒店预定 (hotel booking) 170*v*, truncated autosuggest candidate 师范大学 (Normal University) 170*w*, truncated autosuggest candidate 协和医院 (Union Hospital) 170*x*, truncated autosuggest candidate 公交查询 (bus inquiry) 170*y*, and truncated autosuggest candidate 市工商局 (Municipal Industry and Commerce Bureau) 170*z*.

As shown in FIG. 1B, the set of truncated autosuggest candidates 170 may be presented within rows 141-146 of autosuggest window 140. Again, the number of rows 141-146 may be greater than the number of rows (e.g., 4 or 5) typically provided by a drop-down list on a mobile computing device and may vary based on the number of autosuggest candidates included in the set of truncated autosuggest candidates 170, the lengths of the autosuggest candidates included in the set of truncated autosuggest candidates 170, and/or other design considerations.

Computing device 100, user interface 101, and/or an application that presents user interface 101 may include presentation logic and/or code for selecting truncated autosuggest candidates 170*a*-170*z* for display and/or arranging truncated autosuggest candidates 170*a*-170*z* within rows 141-146 of autosuggest window 140. Truncated autosuggest candidates 170*a*-170*z* may be arranged within rows 141-146 of autosuggest window 140 based on the rank and/or length of each of truncated autosuggest candidates 170*a*-170*z*.

In various implementations, truncated autosuggest candidates may be selected and/or arranged to maximize the number of truncated autosuggest candidates displayed in autosuggest window 140. Shorter truncated autosuggest candidate may be grouped and/or arranged within a particular row to optimally utilize the available slots for truncated autosuggest candidates. When a slot for a truncated autosuggest candidate is available after a certain number of truncated autosuggest candidates have been selected for display, the next most relevant truncated autosuggest candidate having a length which fits in the slot may be selected for display.

As shown in FIG. 1B, one or more of rows 141-146 of autosuggest window 140 may include multiple truncated autosuggest candidates. For instance, row 141 may include truncated autosuggest candidates 170*a*-170*f* displayed adjacent to search box 120. In the implementation shown in FIG. 1B, shorter autosuggest candidates (e.g., truncated autosuggest candidates 170*a*-170*f*) may be displayed at the bottom of autosuggest window 140 and/or adjacent to search box 120, and longer autosuggest candidates (e.g., truncated autosuggest candidates 170*x*-170*z*) may be displayed at the top of autosuggest window 140. In other implementations, shorter truncated autosuggest candidates may be displayed at the top of autosuggest window 140, and longer truncates autosuggest candidates may be displayed at the bottom of autosuggest window 140.

When preliminary search query 124 (e.g., 北京) is presented within search box 120, autosuggest window 140 may display the set of truncated autosuggest candidates 170. Presenting preliminary search query 124 within search box 120 provides context for truncated autosuggest candidates 170*x*-170*z*, which are phrases that do not include preliminary search query 124. Presenting multiple truncated autosuggest candidates per row provides the user with more selections and increases the likelihood that a particular phrase of interest to the user will be displayed and touched. In general, presenting the set of truncated autosuggest candidates 170 encourages the user to construct and/or complete a search query by touching one of truncated autosuggest candidates 170*a*-170*z* rather than further typing on virtual keyboard 110, which is prone to user error. A user still may touch and edit preliminary search query 124 if desired. For example, a user may add a word or otherwise modify preliminary search query 124 search if truncated autosuggest candidates 170*a*-170*z* do not include a phrase of interest to the user.

In some implementations, virtual keyboard 110 may be hidden when a particular autosuggest candidate (e.g., autosuggest candidate 北京 (Beijing) 150*a*) is selected and moved to search box 120 to further encourage the user to construct and/or complete the search query using autosuggest candidates without further typing. Hiding virtual keyboard 110 also may allow additional truncated autosuggest candidates to be presented in autosuggest window 140. In such implementations, virtual keyboard 110 may reappear if the user touches preliminary search query 124 in search box 120 to enable editing and/or if the user touches a button configured to show virtual keyboard 110.

Upon display of the set of truncated autosuggest candidates 170 in autosuggest window 140, one of truncated autosuggest candidates 170*a*-170*z* may be selected by the user. Computing device 100, user interface 101, and/or an application that displays user interface 101 may be configured to detect and respond to the touching of truncated autosuggest candidates 170*a*-170*z* within rows 141-146 of autosuggest window 140. In the implementation shown in FIG. 1B, for instance, the user may touch truncated autosuggest candidate 大学 (university) 170*h* in row 142.

Modified Search Query

Figure 1C:
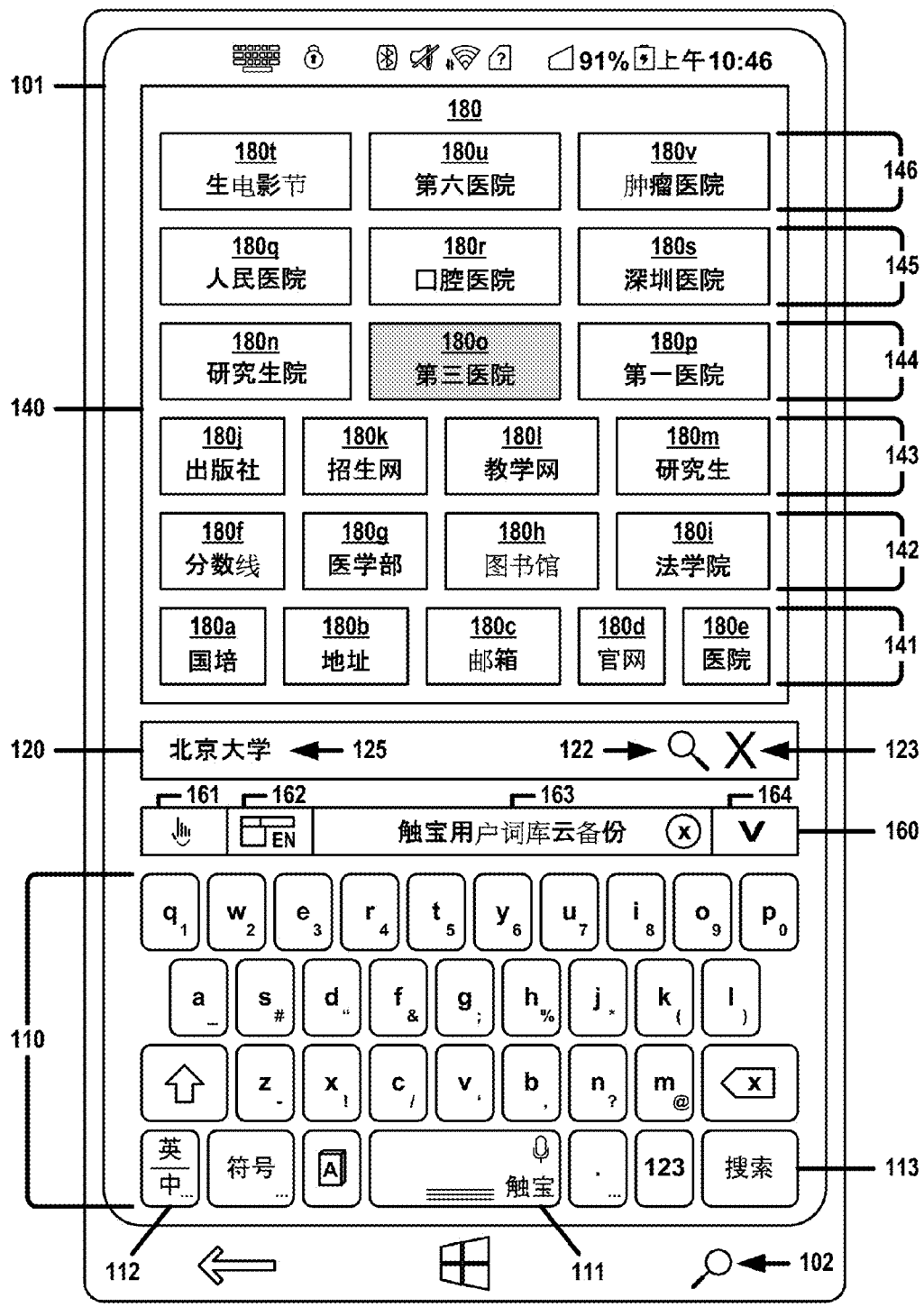

Referring to FIG. 1C with continuing reference to the foregoing figures, user interface 101 may display a modified search query 125 (e.g., 北京大学) within search box 120 based on a user-selected truncated autosuggest suggest candidate (e.g., truncated autosuggest candidate 大学 (university) 170*h*). For example, when touched in autosuggest window 140, truncated autosuggest candidate 大学 (university) 170*h* may be detected and appended to preliminary search query 124 (e.g., 北京) in search box 120. Modified search query 125 (e.g., 北京大学) may be displayed within search box 120 without automatically initiating a web search. In order to initiate a web search for modified search query 125, the user may touch search button 122, enter key 113 (which may be relabeled as a 搜索 (search for) key), or physical search button 102.

When truncated autosuggest candidate 大学 (university) 170*h* is selected in autosuggest window 140, computing device 100 may receive updated autosuggest candidates based on modified search query 125 (e.g., 北京大学). In various implementations, computing device 100 may submit one or more web requests (e.g., HTTP requests) for modified search query 125 and receive updated autosuggest candidates based on modified search query 125 from a remote computer system (e.g., search engine and/or other web service having autosuggest functionality) over a network or combination of networks. The remote computer system may provide the updated autosuggest candidates from an autosuggest dictionary or other repository of words and phrases that map to characters and/or words of modified search query 125. It is to be understood that the updated autosuggest candidates do not include and are to be distinguished from SERPs provided by a search engine in response to initiating a web search for modified search query 125.

The updated autosuggest candidates for modified search query 125 may be automatically suggested based on relevance and/or popularity among a community of users over a certain period of time, various types of user-related data (e.g. past searches conducted by the user, a geographic location of computing device 100, user preferences, a user profile), and/or other factors pertaining to relevance. Providers (e.g., computing device 100, application, etc.) and consumers (e.g., remote computer system, search engine, web service, cloud-based service, etc.) of user-related data may employ a variety of mechanisms in the interests of user privacy and information protection.

In various implementations, the updated autosuggest candidates for modified search query 125 may be received as a listing that is ranked or scored based on relevance, popularity, time, user-related data, and/or other factors pertaining to preliminary search query 124. The updated autosuggest candidates also may be accompanied by metadata that includes a rank or score for each updated autosuggest candidate. The ranked listing of updated autosuggest candidates may include more autosuggest candidates than can fit within autosuggest window 140 and/or certain updated autosuggest candidates that ultimately are not selected for display.

Modified search query 124 and the new autosuggest candidates may be provided using the same type of characters (e.g., non-Latin characters, transliterated characters) and/or in the same language (e.g., Chinese). In some implementations, the updated autosuggest candidates may be provided in multiple different languages using the Latin or non-Latin characters appropriate for such different languages.

In some cases, each updated autosuggest candidate may include modified search query 125 (e.g., 北京大学) as a common prefix. In other cases, a set of updated autosuggest candidates containing only updated autosuggest candidates that include modified search query 125 as a common prefix may be generated. Additionally, certain updated autosuggest candidates that include modified search query 125 as a common prefix may be excluded from the set to increase the diversity of the updated autosuggest candidates.

In various implementations, a set of truncated autosuggest candidates 180 may be generated by removing the common prefix (e.g., 北京大学, modified search query 125) from each updated autosuggest candidate at the character and/or word level. Computing device 100, user interface 101, and/or an application that presents user interface 101 may include logic and/or code for generating the set of truncated autosuggest candidates 180 from the updated autosuggest candidates. Alternatively, computing device 100 may receive the set of truncated autosuggest candidates 180 from a remote computer system (e.g., search engine and/or other web service having autosuggest functionality) in response to modified search query 125.

In the exemplary implementation shown in FIG. 1C, the truncated autosuggest candidates based on modified search query 125 (e.g., 北京大学) may include: 国培 (national training) 180*a*, 地址 (address) 180*b*, 邮箱 (mailbox) 180*c*, 官网 (official website) 180*d*, 医院 (hospital) 180*e*, 分数线 (score threshold) 180*f*, 医学部 (medical school/division) 180*g*, 图书馆 (library) 180*h*, 法学院 (School of Law) 180*i*, 出版社 (publisher) 180*j*, 招生网 (admissions network) 180*k*, 教学网 (teaching network) 180*l*, 研究生 (graduate student) 180*m*, 研究生院 (graduate school) 180*n*, 第三医院 (Third Hospital) 180*o*, 第三医院 (First Hospital) 180*p*, 人民医院 (People's Hospital) 180*q*, 口腔医院 (stomatological hospital) 180*r*, 深圳医院 (Shenzhen Hospital) 180*s*, 大电影节 (college student film festival) 180*t*, 第六医院 (Sixth Hospital) 180*u*, and 肿瘤医院 (cancer hospital) 180*v*.

When modified search query 125 (e.g., 北京大学) is presented in search box 120, truncated autosuggest candidates 180*a*-180*v* may be displayed within rows 141-146 of autosuggest window 140. As shown, one or more of rows 141-146 of autosuggest window 140 may include multiple truncated autosuggest candidates. Truncated autosuggest candidates 180*a*-180*v* may be arranged within rows 141-146 of autosuggest window 140 based on the rank and/or length of each of truncated autosuggest candidates 180*a*-180*v*. Computing device 100, user interface 101, and/or an application that presents user interface 101 may include presentation logic and/or code for selecting truncated autosuggest candidates 180*a*-180*v* for display and/or arranging truncated autosuggest candidates 180*a*-180*v* within rows 141-146 of autosuggest window 140.

Upon display of the set of truncated autosuggest candidates 180 in autosuggest window 140, one of truncated autosuggest candidates 180*a*-180*v* may be selected by the user. Alternatively, the user may touch and edit modified search query 125 if truncated autosuggest candidates 180*a*-180*v* do not include a phrase of interest to the user. Computing device 100, user interface 101, and/or an application that displays user interface 101 may be configured to detect and respond to the touching of truncated autosuggest candidates 180*a*-180*v* within rows 141-146 of autosuggest window 140. In the implementation shown in FIG. 1C, for instance, the user may touch truncated autosuggest candidate 第三医院 (Third Hospital) 180*o* in row 144.

Figure 1D:
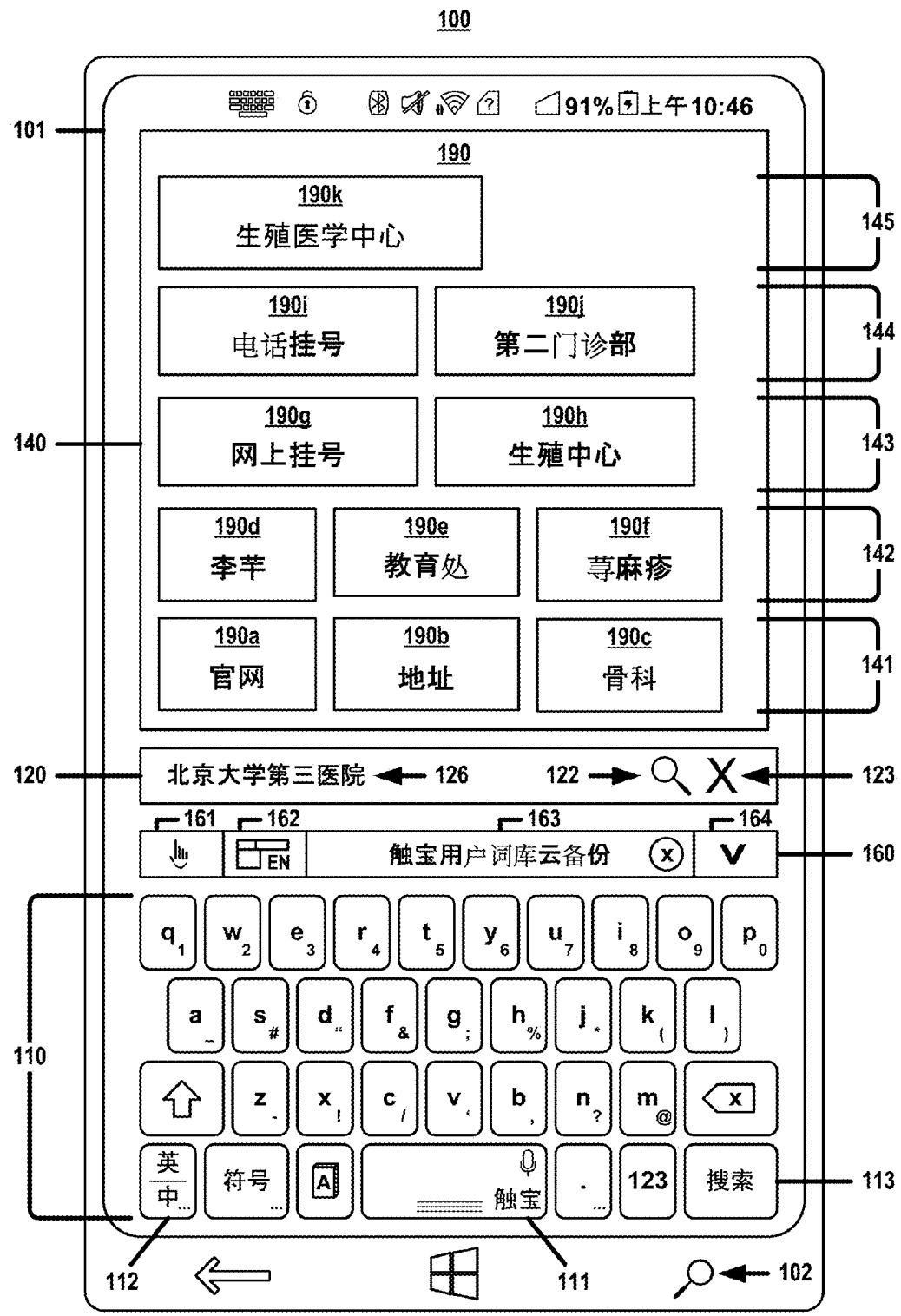

Referring to FIG. 1D with continuing reference to the foregoing figures, user interface 101 may display a modified search query 126 (e.g., 北京大学第三医院) within search box 120 based on a user-selected truncated autosuggest suggest candidate (e.g., truncated autosuggest candidate 第三医院 (Third Hospital) 180*o*). For example, when touched in autosuggest window 140 truncated autosuggest candidate 第三医院 (Third Hospital) 180*o* may be detected and appended to modified search query 125 (e.g., 北京大学) in search box 120. Modified search query 126 (e.g., 北京大学第三医院) may be displayed within search box 120 without automatically initiating a web search. In order to initiate a web search for modified search query 126, the user may touch search button 122, enter key 113 (which may be relabeled as a 搜索 (search for) key), or physical search button 102.

When truncated autosuggest candidate 第三医院 (Third Hospital) 180*o* is selected in autosuggest window 140, computing device 100 may receive updated autosuggest candidates based on modified search query 126 (e.g., 北京大学第三医院). It is to be understood that the updated autosuggest candidates do not include and are to be distinguished from SERPs provided by a search engine in response to initiating a web search for modified search query 126. Computing device 100 may generate a set of truncated autosuggest candidates 190 by removing the common prefix (e.g., 北京大学第三医院, modified search query 126) from each updated autosuggest candidate at the character and/or word level. Alternatively, computing device 100 may receive the set of truncated autosuggest candidates 190 from a remote computer system (e.g., search engine and/or other web service having autosuggest functionality) in response to modified search query 126.

In the exemplary implementation shown in FIG. 1D, the truncated autosuggest candidates based on modified search query 126 (e.g., 北京大学第三医院) may include: truncated autosuggest candidate 官网 (official website) 190*a*, truncated autosuggest candidate 地址 (address) 190*b*, truncated autosuggest candidate 骨科 (orthopedics) 190*c*, truncated autosuggest candidate 李芊 (Li Gan) 190*d*, truncated autosuggest candidate 教育处 (education department) 190*e*, truncated autosuggest candidate 荨麻疹 (Urticaria) 190*f*, truncated autosuggest candidate 网上挂号 (online appointment) 190*g*, truncated autosuggest candidate 生殖中心 (reproductive center) 190*h*, truncated autosuggest candidate 电话挂号 (telephone appointment) 190*i*, truncated autosuggest candidate 第二门诊部 (the second clinic) 190*j*, truncated autosuggest candidate and 生殖医学中心 (Center for Reproductive Medicine) 190*k*.

When modified search query 126 (e.g., 北京大学第三医院) is presented in search box 120, truncated autosuggest candidates 190*a*-190*k* may be displayed within rows 141-145 of autosuggest window 140 for selection by the user. The user may touch and edit modified search query 126 if truncated autosuggest candidates 190*a*-190*k* do not include a phrase of interest to the user.

If the user is satisfied with modified search query 126, the user may initiate a web search for modified search query 126 by touching search button 122, enter key 113 (which may be relabeled as a 搜索 (search for) key), or physical search button 102. In general, initiating a web search will result in delivery of one or more SERPs including links to web pages that are relevant to modified search query 126. Requiring the user to take action to initiate a web search reduces the likelihood that the user accidentally or prematurely performs a web search before constructing a completed search query. Accordingly, user error can be avoided and processing resources of computing device 100 and/or a remote computer system (e.g., search engine, web service, cloud-based service, etc.) can be conserved.

It can be appreciated that constructing a search query in accordance with the described embodiments provide various attendant and/or technical advantages. By way of illustration and not limitation, various features and implementations reduce user error when constructing a search query and/or facilitate one-handed operation of computing device 100. Presenting the user with numerous and diverse autosuggest candidates (e.g., autosuggest candidates 150a-150r, truncated autosuggest candidates 170a-170z, truncated autosuggest candidates 180a-180v, truncated autosuggest candidates 190a-190k, etc.) during a query input stage encourages the user to construct a search query by making selections from autosuggest window 140 rather than typing on virtual keyboard 110, which is prone to user error.

Autosuggest window 140 provides larger touch regions as compared to the small character keys on virtual keyboard 110, which facilitates receiving touch input. Additionally, autosuggest window 140 includes several rows of autosuggest candidates with one or more rows containing multiple autosuggest candidates, which increases the likelihood that an autosuggest candidate of interest to the user will be displayed and touched. Suggestion diversity is improved by supporting multiple different languages and/or IME (or IME-like) functionality for mapping Latin, non-Latin, and/or input method characters (e.g., Pinyin characters) to one or multiple translations, conversions, and/or transliterations. Truncated autosuggest candidates (e.g., truncated autosuggest candidates 170a-170z, truncated autosuggest candidates 180a-180v, truncated autosuggest candidates 190a-190k, etc.) provide shorter autosuggest candidates, which facilitates reading and allows autosuggest window 140 to accommodate a greater number of autosuggest candidates.

After initially providing a small amount of user input (e.g., characters of a word, single word, etc.) via virtual keyboard 110, a user can construct and complete a search query with a few touches to autosuggest window 140 and without further use of virtual keyboard 110. Furthermore, user-selected autosuggest candidates (e.g., autosuggest candidate 150a, truncated autosuggest candidate 170h, truncated autosuggest candidate 180o, etc.) are moved to search box 120 without automatically initiating a web search, which reduces the likelihood that the user accidentally or prematurely performs a web search before constructing a completed search query and conserves processing resources of computing device 100 and/or a remote computer system (e.g., search engine, web service, cloud-based service, etc.). Moving autosuggest candidates to search box 120 when touched also avoids the need to navigate using directional keys, which are not included on virtual keyboards (e.g., virtual keyboard 110) for mobile devices. Additionally, autosuggest candidates are moved to search box 120 without the use of arrow or plus symbol (+) icons, which are difficult to accurately touch when desired and easy to touch by mistake, especially during one-handed operation of a small touchscreen device.

Exemplary Architecture

Figure 2:
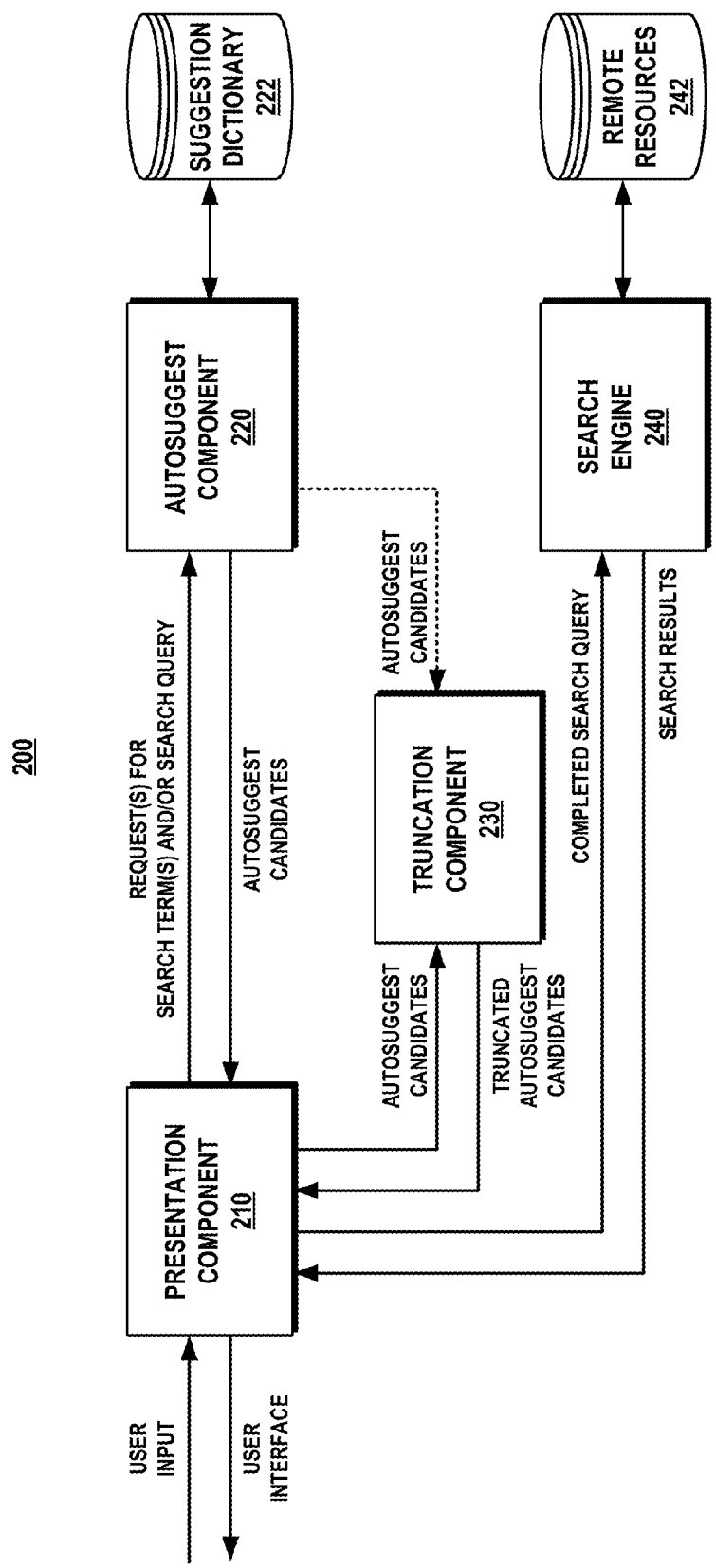
FIG. 2 illustrates an embodiment of an exemplary architecture in accordance with aspects of the described subject matter.

FIG. 2 illustrates an autosuggest architecture 200 as an embodiment of an exemplary architecture in accordance with the described subject matter. It is to be appreciated that autosuggest architecture 200, or portions thereof, may be implemented by various components, computing devices, and/or computer systems. Components of autosuggest architecture may be implemented by software, hardware, firmware or a combination thereof. In various embodiments, components of autosuggest architecture 200 may be implemented by computer-executable instructions that are stored on one or more computer-readable storage media and that are executed by one or more processors, computing devices, and/or computer systems to perform particular tasks or implement particular data types in accordance with aspects of the described subject matter.

Referring to FIG. 2 with continuing reference to the foregoing figures, autosuggest architecture 200 may include a presentation component 210 configured to display user interface 101. Presentation component 210 may be implemented by computing device 100 or other suitable client-side computing device in accordance with aspects of the described subject matter. Alternatively or additionally, presentation component 210 or portions thereof may be implemented by a remote computer system that implements a search engine and/or other web service (e.g., cloud-based service) having autosuggest functionality.

Presentation component 210 may be configured to receive and respond to user input (e.g., touch input, voice input, handwriting input, etc.) supplied in one or more languages and/or using one or more types of characters (e.g., Latin characters, input method characters, non-Latin characters, etc.). Presentation component 210 may support IME or IME-like functionality and may be configured to receive and interpret Latin keystrokes according to an input method for a non-Latin language (e.g., Chinese, Japanese, Korean, Vietnamese, Indic, etc.). Presentation component 210 may be configured to respond to user input by submitting one or more requests (e.g., web requests, HTTP requests) for a search term (e.g., search term 121) and/or a search query (e.g., preliminary search query 124, modified search query 125, modified search query 126, completed search query, etc.).

Autosuggest architecture 200 may include an autosuggest component 220 configured to provide autosuggest candidates (e.g., initial autosuggest candidates, new autosuggest candidates, updated autosuggest candidates, etc.) in response to a request for a search term and/or a search query received from presentation component 210. Autosuggest component 220 may be implemented by a remote computer system that provides a search engine and/or web service (e.g., cloud-based service) having autosuggest functionality. Alternatively or additionally, autosuggest component 220 or portions thereof may be implemented by computing device 100 or other suitable client-side computing device.

In various scenarios, presentation component 210 may submit a request to autosuggest component 220 when or as the user types, speaks, and/or handwrites one or more words and/or in response to a user-selected autosuggest candidate. In response, autosuggest component 220 may obtain autosuggest candidates from a suggestion dictionary 222 or other repository of words and phrases that map to characters and/or words of a search term or search query. Autosuggest component 220 may provide autosuggest candidates based on relevance and/or popularity among a community of users over a certain period of time, various types of user-related data (e.g. past searches conducted by the user, a geographic location of computing device 100, user preferences, a user profile), and/or other factors pertaining to relevance. A variety of mechanisms may be employed in the interests of user privacy and protection of user-related data, as described above.

Autosuggest candidates provided by autosuggest component 220 may include one or multiple translations, conversions, and/or transliterations of a search term or search query. Some autosuggest candidates may be based on another autosuggest candidate (e.g., translation, conversion, transliteration, etc.). Autosuggest component 220 may provide autosuggest candidates as a ranked listing that may be accompanied by metadata (e.g., rank, score, length, etc.) for each autosuggest candidate. Autosuggest component 220 may provide more autosuggest candidates than can fit within autosuggest window 140 and/or certain updated autosuggest candidates that ultimately are not selected for display. In various implementations, autosuggest candidates may begin with a common prefix such as a search term, a translation of a search term, a conversion of a search term, a transliteration of a search term, and/or a search query.

Autosuggest architecture 200 may include a truncation component 230 configured to generate truncated autosuggest candidates from new and/or updated autosuggest candidates. Truncation component 230 may generate truncated autosuggest components by identifying, extracting, and/or otherwise removing a common prefix (e.g., a search term, a translation of a search term, a conversion of a search term, a transliteration of a search term, and/or a search query) from new and/or updated autosuggest candidates. In some embodiments, truncation component 230 may be implemented by computing device 100 (or other suitable client-side computing device) and may receive new and/or updated autosuggest candidates from presentation component 210. In other embodiments, truncation component 230 may be implemented by a remote computer system (e.g., search engine and/or other web service having autosuggest functionality) and may receive new and/or updated autosuggest candidates from autosuggest component 220.

Presentation component 210 may be configured to select and/or arrange autosuggest candidates received from autosuggest component 220 and truncated autosuggest candidates received from truncation component 230. Presentation component 210 may select or exclude certain autosuggest candidates or truncated autosuggest candidates to increase suggestion diversity. Presentation component 210 may arrange autosuggest candidates or truncated autosuggest candidates based on rank and/or length and may present the user with as many selections as possible. In various implementations, several rows of autosuggest candidates or truncated autosuggest candidates may be displayed with one or more rows including multiple autosuggest candidates or multiple truncated autosuggest candidates.

Presentation component 210 may move user-selected autosuggest candidates and/or user-selected truncated autosuggest candidates to search box 120 without automatically initiating a web search. Presentation component 210 may append a user-selected truncated autosuggest candidate to a search query that may include a user-selected autosuggest candidate (e.g., a conversion and/or transliteration of one or more search terms). Presentation component 210 may display a completed search query constructed from user-selected autosuggest candidates and/or truncated autosuggest candidates. In response to the user taking action to initiate a web search, presentation component 210 may submit a request for the completed search query.

Autosuggest architecture 200 may include a search engine 240 configured to provide search results in response to a completed search query constructed from one or more user-selected truncated autosuggest candidates. Search engine 240 may obtain search results from remote resources 242 such as: server-hosted resources, cloud-based resources, online resources, remote data stores, remote databases, remote repositories, web services, web sites, web pages, web content, and/or other types of web resources. In various implementations, the search results may include SERPs including links to web pages that are relevant to the completed search query.

Exemplary Processes

With continuing reference to the foregoing figures, exemplary processes are described below to further illustrate aspects of the described subject matter. It is to be understood that the following exemplary process are not intended to limit the described subject matter to particular implementations.

Figure 3:
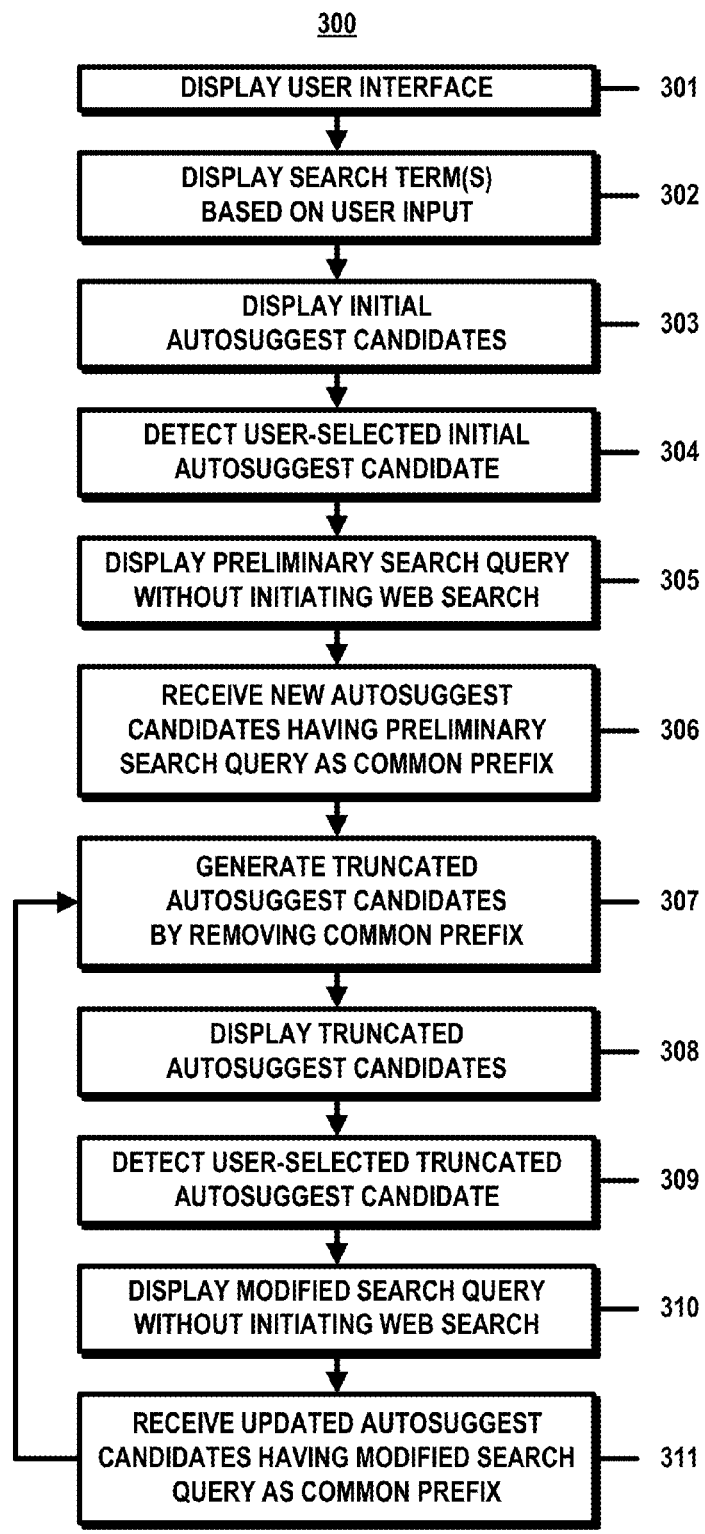
FIG. 3 illustrates an embodiment of an exemplary process in accordance with aspects of the described subject matter.

FIG. 3 illustrates a computer-implemented method 300 as an embodiment of an exemplary process in accordance with aspects of the described subject matter. In one implementation, computer-implemented method 300 may be performed by a computing device such as computing device 100 or other suitable client-side computing device. It is to be appreciated that computer-implemented method 300, or portions thereof, may be performed by various computing devices, computer systems, components, and/or computer-executable instructions stored on one more computer-readable storage media.

At 301, a computing device may display user interface. For example, computing device 100 may display user interface 101 or other suitable search interface for allowing a user to construct and submit a search query. User interface 101 may include a search box 120 for displaying one or more search terms in response to user input. User interface 101 may be presented by a web browsing and/or other type of application and may be configured to receive and respond to touch input, voice input, handwriting input, and/or types of user input. User interface 101 may support user input supplied in one or more languages (e.g., English, Chinese, Japanese, Korean, Vietnamese, Indic, etc.) and/or using one or more types of characters (e.g., Latin characters, input method characters, non-Latin characters, etc.).

At 302, the computing device may display one or more search terms based on user input. For example, computing device 100 may display search term 121 based on user input via virtual keyboard 110. The one or more search terms (e.g., search term 121) may be displayed within search box 120. To initiate a web search, a user may be required to take action such as touching search button 122, enter key 113, or physical search button 102 on computing device 100. A user may touch search box 120 to edit the one or more search terms using one or more types of user input.

At 303, the computing device may display initial autosuggest candidates. For example, computing device 100 may display initial autosuggest candidates 150a-150r. The initial autosuggest candidates may be displayed within rows 141-146 with one or more the rows including multiple initial autosuggest candidates. The initial autosuggest candidates may be arranged within the rows based on rank and/or length. In some cases, the one or more search terms may be displayed using Latin characters, and the initial autosuggest candidates may include one or multiple conversions of the one or more search terms into non-Latin characters. The initial autosuggest candidates may include one or more phrases that are displayed using non-Latin characters and that begin with one of the conversions followed by one or more words.

At 304, the computing device may detect a user-selected initial autosuggest candidate. For example, computing device 100 may detect the touching of autosuggest candidate 150a presented within row 141. The user-selected initial autosuggest candidate may be chosen from one of several initial autosuggest candidates that are displayed in the same row. In some cases, the user-selected initial autosuggest candidate may be a conversion or transliteration of the one or more search terms and/or a phrase that begins with such conversion.

At 305, the computing device may display a preliminary search query without initiating a web search. For example, computing device 100 may display preliminary search query 124 in search box 120. The user-selected initial autosuggest candidate may be displayed as the preliminary search query and replace the one or more search terms without automatically initiating a web search for the preliminary search query.

At 306, the computing device may receive new autosuggest candidates having the preliminary search query as a common prefix. For example, computing device 100 may receive new autosuggest candidates that begin with the same characters as the preliminary search query (and the user-selected initial autosuggest candidate) from a remote computer system that implements a search engine and/or other web service (e.g., cloud-based service) having autosuggest functionality. The new autosuggest candidates may be ranked and/or accompanied by metadata indicating rank and/or length. The new autosuggest candidates may be received without being displayed.

At 307, the computing device may generate truncated autosuggest candidates by removing the common prefix. For example, computing device 100 may generate truncated autosuggest candidates 170a-170z from the new autosuggest candidates. The common prefix or preliminary search query may be identified and extracted from each of the new autosuggest candidates. The length of each truncated autosuggest candidate will be shorter than its corresponding new autosuggest candidate allowing more truncated autosuggest candidates to be displayed.

At 308, the computing device may display truncated autosuggest candidates. For example, computing device 100 may display truncated autosuggest candidates 170a-170z within rows 141-146 with one or more the rows including multiple truncated autosuggest candidates. The truncated autosuggest candidates may be arranged within the rows based on rank and/or length. The preliminary search query may be displayed in proximity to the truncated autosuggest candidates, which provides context for the shorter phrases.

At 309, computing device 100 may detect a user-selected truncated autosuggest candidate. For example, computing device 100 may detect the touching of truncated autosuggest candidate 170h presented within row 142. The user-selected truncated autosuggest candidate may be chosen from one of several truncated autosuggest candidates that are displayed in the same row.

At 310, the computing device may display a modified search query without initiating a web search. For example, computing device 100 may display modified search query 125 in search box 120. The user-selected truncated autosuggest candidate may be moved to search box 120 and appended to the preliminary search query to construct a modified search query. To initiate a web search for the modified search query, a user may be required to take action such as touching search button 122, enter key 113, or physical search button 102 on computing device 100. A user may touch search box 120 to edit the modified search query using one or more types of user input.

At 311, the computing device may receive updated autosuggest candidates having the modified search query as a common prefix. For example, computing device 100 may receive updated autosuggest candidates that begin with the same characters as the modified search query (and the user-selected initial autosuggest candidate and the user-selected truncated autosuggest candidate) from a remote computer system that implements a search engine and/or other web service (e.g., cloud-based service) having autosuggest functionality. The updated autosuggest candidates may be ranked and/or accompanied by metadata indicating rank and/or length. The updated autosuggest candidates may be received without being displayed.

After 311, the computing device may repeat the foregoing operations until a completed search query is constructed from one or more user-selected truncated autosuggest candidates. The computing device may initiate and/or launch a web search for the completed search query in response to the user taking action such as touching search button 122, enter key 113, or physical search button 102. The computing device mat receive and display search results such as one or more SERPs including links to web pages that are relevant to the completed search query.

Figure 4:
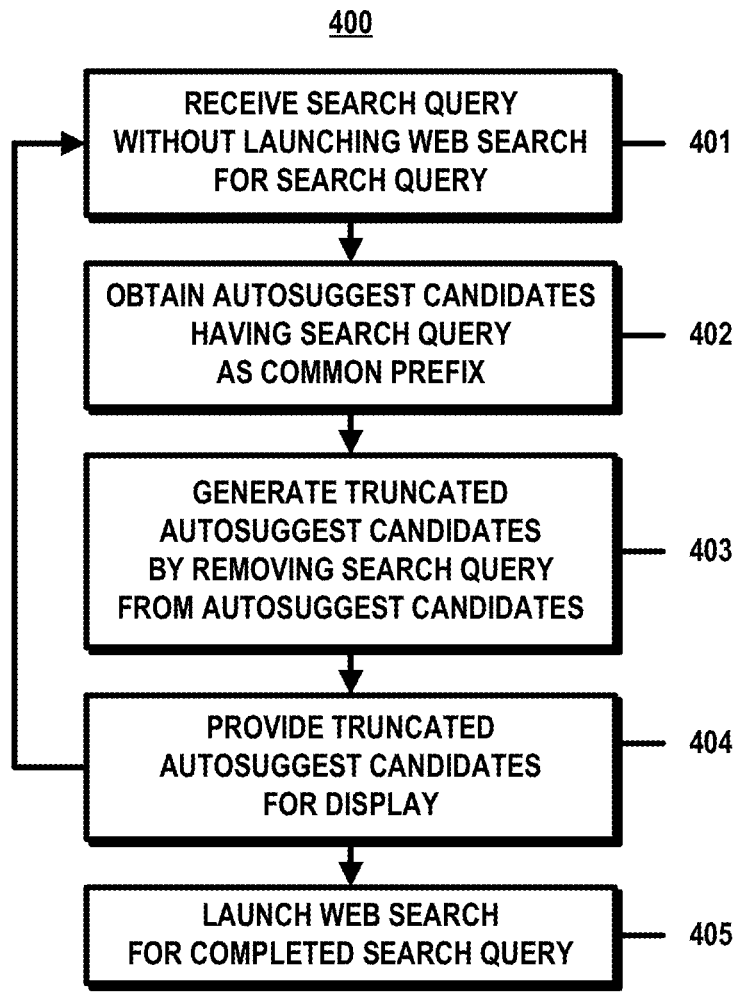
FIG. 4 illustrates an embodiment of an exemplary process in accordance with aspects of the described subject matter.

FIG. 4 illustrates a computer-implemented method 400 as an embodiment of an exemplary process in accordance with aspects of the described subject matter. In some implementations, computer-implemented method 300 may be performed by computing device 100 or other suitable client-side computing device. In other implementations, computer-implemented method 400 may be performed by one or more server-side computing devices of a computer system that provides a search engine and/or other web service (e.g., cloud-based service) having autosuggest functionality. It is to be appreciated that computer-implemented method 400, or portions thereof, may be performed by various computing devices, computer systems, components, and/or computer-executable instructions stored on one more computer-readable storage media.

At 401, a computing device may receive a search query without launching a web search for the search query. As an example, computing device 100 may implement presentation component 210 and may receive and present preliminary search query 124, modified search query 125, and/or modified search query 126 in user interface 101 (e.g., within search box 120) without launching a web search. As another example, a computing device of a computer system may implement autosuggest component 220 and may receive preliminary search query 124, modified search query 125, and/or modified search query 126 as part of a request (e.g., web request, HTTP request) for autosuggest candidates submitted by presentation component 210. Autosuggest component 220 may respond to such request by providing autosuggest candidates based on the search query, rather than launching a web search for the search query.

At 402, the computing device may obtain autosuggest candidates having the search query as a common prefix. As an example, computing device 100 may implement presentation component 210 and may receive autosuggest candidates that include phrases which begin with preliminary search query 124, modified search query 125, and/or modified search query 126. As another example, a computing device of a computer system may implement autosuggest component 220 and retrieve phrases which begin with preliminary search query 124, modified search query 125, and/or modified search query 126 from suggestion dictionary 222.

At 403, the computing device may generate truncated autosuggest candidates by removing the search query from the autosuggest candidates. For example, computing device 100 or a computing device of a computer system may implement truncation component 230 and may generate truncated autosuggest candidates 170a-170z by removing preliminary search query 124 from new autosuggest candidates. Truncated autosuggest candidates 180a-180v also may be generated by removing modified search query 125 from updated autosuggest candidates, and truncated autosuggest candidates 190a-190k may be generated by removing modified search query 125 from updated autosuggest candidates.

At 404, the computing device may provide truncated autosuggest candidates for display. For example, computing device 100 or a computing device of a computer system may implement truncation component 230 and may provide truncated autosuggest candidates 170a-170z, truncated autosuggest candidates 180a-180v, and/or truncated autosuggest candidates 190a-190k. Truncation component 230 may provide truncated autosuggest components to presentation component 210 which, in turn, may provide such truncated autosuggest components for display within rows of autosuggest window 140. One or more rows of autosuggest window 140 may include multiple truncated autosuggest candidates.

After 404, the computing device may repeat the foregoing operations until a completed search query is constructed from one or more user-selected truncated autosuggest candidates.

At 405, the computing device may launch a web search for a completed search query. As an example, computing device 100 may implement presentation component 210 and may launch a web search for a completed search query in response to the user taking action such as touching search button 122, enter or 搜索 (search for) key 113, or physical search button 102. As another example, a computing device of a computer system may implement search engine 240 and may launch a web search for a completed search query in response to a request from presentation component 210. Search results from search engine 240 may be provided to and displayed by computing device 100 as one or more SERPs including links to web pages that are relevant to the completed search query.

Exemplary Operating Environments

Aspects of the described subject matter may be implemented for and/or by various operating environments, computer networks, platforms, frameworks, computer architectures, and/or computing devices. Aspects of the described subject matter may be implemented by computer-executable instructions that may be executed by one or more computing devices, computer systems, and/or processors.

In its most basic configuration, a computing device and/or computer system may include at least one processing unit (e.g., single-processor units, multi-processor units, single-core units, and/or multi-core units) and memory. Depending on the exact configuration and type of computer system or computing device, the memory implemented by a computing device and/or computer system may be volatile (e.g., random access memory (RAM)), nonvolatile (e.g., read-only memory (ROM), flash memory, and the like), or a combination thereof.

A computing device and/or computer system may have additional features and/or functionality. For example, a computing device and/or computer system may include hardware such as additional storage (e.g., removable and/or non-removable) including, but not limited to: solid state, magnetic, optical disk, or tape.

A computing device and/or computer system typically may include or may access a variety of computer-readable media. For instance, computer-readable media can embody computer-executable instructions for execution by a computing device and/or a computer system. Computer readable media can be any available media that can be accessed by a computing device and/or a computer system and includes both volatile and non-volatile media, and removable and non-removable media. As used herein, the term "computer-readable media" includes computer-readable storage media and communication media.

The term "computer-readable storage media" as used herein includes volatile and nonvolatile, removable and non-removable media for storage of information such as computer-executable instructions, data structures, program modules, or other data. Examples of computer-readable storage media include, but are not limited to: memory storage devices such as RAM, ROM, electrically erasable program read-only memory (EEPROM), semiconductor memories, dynamic memory (e.g., dynamic random access memory (DRAM), synchronous dynamic random access memory (SDRAM), double data rate synchronous dynamic random-access memory (DDR SDRAM), etc.), integrated circuits, solid-state drives, flash memory (e.g., NAN-based flash memory), memory chips, memory cards, memory sticks, thumb drives, and the like; optical storage media such as Blu-ray discs, digital video discs (DVDs), compact discs (CDs), CD-ROM, optical disc cartridges, and the like; magnetic storage media including hard disk drives, floppy disks, flexible disks, magnetic cassettes, magnetic tape, and the like; and other types of computer-readable storage devices. It can be appreciated that various types of computer-readable storage media (e.g., memory and additional hardware storage) may be part of a computing device and/or a computer system. As used herein, the terms "computer-readable storage media" and "computer-readable storage medium" do not mean and unequivocally exclude a propagated signal, a modulated data signal, a carrier wave, or any other type of transitory computer-readable medium.

Communication media typically embodies computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media.

In various embodiments, aspects the described subject matter may be implemented by computer-executable instructions stored on one or more computer-readable storage media. Computer-executable instructions may be implemented using any various types of suitable programming and/or markup languages such as: Extensible Application Markup Language (XAML), XML, XBL HTML, XHTML, XSLT, XMLHttpRequestObject, CSS, Document Object Model (DOM), Java®, JavaScript, JavaScript Object Notation (JSON), Jscript, ECMAScript, Ajax, Flash®, Silverlight™, Visual Basic® (VB), VBScript, PHP, ASP, Shockwave®, Python, Perl®, C, Objective-C, C++, C#/.net, and/or others.

A computing device and/or computer system may include various input devices, output devices, communication interfaces, and/or other types of devices. Exemplary input devices include, without limitation: a user interface, a keyboard/keypad, a touch screen, a touch pad, a pen, a mouse, a trackball, a remote control, a game controller, a camera, a barcode reader, a microphone or other voice input device, a video input device, laser range finder, a motion sensing device, a gesture detection device, and/or other type of input mechanism and/or device. A computing device may provide a Natural User Interface (NUI) that enables a user to interact with the computing device in a "natural" manner, free from artificial constraints imposed by input devices such as mice, keyboards, remote controls, and the like. Examples of NUI technologies include, without limitation: voice and/or speech recognition, touch and/or stylus recognition, motion and/or gesture recognition both on screen and adjacent to a screen using accelerometers, gyroscopes and/or depth cameras (e.g., stereoscopic or time-of-flight camera systems, infrared camera systems, RGB camera systems and/or combination thereof), head and eye tracking, gaze tracking, facial recognition, 3D displays, immersive augmented reality and virtual reality systems, technologies for sensing brain activity using electric field sensing electrodes (EEG and related methods), intention and/or goal understanding, and machine intelligence.

A computing device may be configured to receive and respond to input in various ways depending upon implementation. Responses may be presented in various forms including, for example: presenting a user interface, outputting an object such as an image, a video, a multimedia object, a document, and/or other type of object; outputting a text response; providing a link associated with responsive content; outputting a computer-generated voice response or other audio; or other type of visual and/or audio presentation of a response. Exemplary output devices include, without limitation: a display, a projector, a speaker, a printer, and/or other type of output mechanism and/or device.

A computing device and/or computer system may include one or more communication interfaces that allow communication between and among other computing devices and/or computer systems. Communication interfaces may be used in the context of network communication between and among various computing devices and/or computer systems. Communication interfaces may allow a computing device and/or computer system to communicate with other devices, other computer systems, web services (e.g., an affiliated web service, a third-party web service, a remote web service, and the like), web service applications, and/or information sources (e.g. an affiliated information source, a third-party information source, a remote information source, and the like). As such communication interfaces may be used in the context of accessing, obtaining data from, and/or cooperating with various types of resources.

Communication interfaces also may be used in the context of distributing computer-executable instructions over a network or combination of networks. For example, computer-executable instructions can be combined or distributed utilizing remote computers and storage devices. A local or terminal computer may access a remote computer or remote storage device and download a computer program or one or more parts of the computer program for execution. It also can be appreciated that the execution of computer-executable instructions may be distributed by executing some instructions at a local terminal and executing some instructions at a remote computer.

A computing device may be implemented by a mobile computing device such as: a mobile phone (e.g., a cellular phone, a smart phone such as a Microsoft® Windows® phone, an Apple iPhone, a BlackBerry® phone, a phone implementing a Google® Android™ operating system, a phone implementing a Linux® operating system, or other type of phone implementing a mobile operating system), a tablet computer (e.g., a Microsoft® Surface® device, an Apple iPad™, a Samsung Galaxy Note® Pro, or other type of tablet device), a laptop computer, a notebook computer, a netbook computer, a personal digital assistant (PDA), a portable media player, a handheld gaming console, a wearable computing device (e.g., a smart watch, a head-mounted device including smart glasses such as Google® Glass™, a wearable monitor, etc.), a personal navigation device, a vehicle computer (e.g., an on-board navigation system), a camera, or other type of mobile device.

A computing device may be implemented by a stationary computing device such as: a desktop computer, a personal computer, a server computer, an entertainment system device, a media player, a media system or console, a video-game system or console, a multipurpose system or console (e.g., a combined multimedia and video-game system or console such as a Microsoft® Xbox® system or console, a Sony® PlayStation® system or console, a Nintendo® system or console, or other type of multipurpose game system or console), a set-top box, an appliance (e.g., a television, a refrigerator, a cooking appliance, etc.), or other type of stationary computing device.

A computing device also may be implemented by other types of processor-based computing devices including digital signal processors, field-programmable gate arrays (FPGAs), program- and application-specific integrated circuits (PASIC/ASICs), program- and application-specific standard products (PSSP/ASSPs), a system-on-a-chip (SoC), complex programmable logic devices (CPLDs), and the like.

A computing device may include and/or run one or more computer programs implemented, for example, by software, firmware, hardware, logic, and/or circuitry of the computing device. Computer programs may be distributed to and/or installed on a computing device in various ways. For instance, computer programs may be pre-installed on a computing device by an original equipment manufacturer (OEM), installed on a computing device as part of installation of another computer program, downloaded from an application store and installed on a computing device, distributed and/or installed by a system administrator using an enterprise network management tool, and distributed and/or installed in various other ways depending upon the implementation.

Computer programs implemented by a computing device may include one or more operating systems. Exemplary operating systems include, without limitation: a Microsoft® operating system (e.g., a Microsoft® Windows® operating system), a Google® operating system (e.g., a Google® Chrome OS™ operating system or a Google® Android™ operating system), an Apple operating system (e.g., a Mac OS® or an Apple iOS™ operating system), an open source operating system, or any other operating system suitable for running on a mobile, stationary, and/or processor-based computing device.

Computer programs implemented by a computing device may include one or more client applications. Exemplary client applications include, without limitation: a web browsing application, a communication application (e.g., a telephony application, an e-mail application, a text messaging application, an instant messaging application, a web conferencing application, and the like), a media application (e.g., a video application, a movie service application, a television service application, a music service application, an e-book application, a photo application, and the like), a calendar application, a file sharing application, a personal assistant or other type of conversational application, a game application, a graphics application, a shopping application, a payment application, a social media application, a social networking application, a news application, a sports application, a weather application, a mapping application, a navigation application, a travel application, a restaurants application, an entertainment application, a healthcare application, a lifestyle application, a reference application, a finance application, a business application, an education application, a productivity application (e.g., word processing application, a spreadsheet application, a slide show presentation application, a note-taking application, and the like), a security application, a tools application, a utility application, and/or any other type of application, application program, and/or app suitable for running on a mobile, stationary, and/or processor-based computing device.

Computer programs implemented by a computing device may include one or more server applications. Exemplary server applications include, without limitation: one or more server-hosted, cloud-based, and/or online applications associated with any of the various types of exemplary client applications described above; one or more server-hosted, cloud-based, and/or online versions of any of the various types of exemplary client applications described above; one or more applications configured to provide a web service, a web site, a web page, web content, and the like; one or more applications configured to provide and/or access an information source, data store, database, repository, and the like; and/or other type of application, application program, and/or app suitable for running on a server computer.

A computer system may be implemented by a computing device, such as a server computer, or by multiple computing devices configured to implement a service in which one or more suitably-configured computing devices may perform one or more processing steps. A computer system may be implemented as a distributed computing system in which components are located on different computing devices that are connected to each other through network (e.g., wired and/or wireless) and/or other forms of direct and/or indirect connections. A computer system also may be implemented via a cloud-based architecture (e.g., public, private, or a combination thereof) in which services are delivered through shared datacenters. Some components of a computer system may be disposed within a cloud while other components are disposed outside of the cloud.

Figure 5:
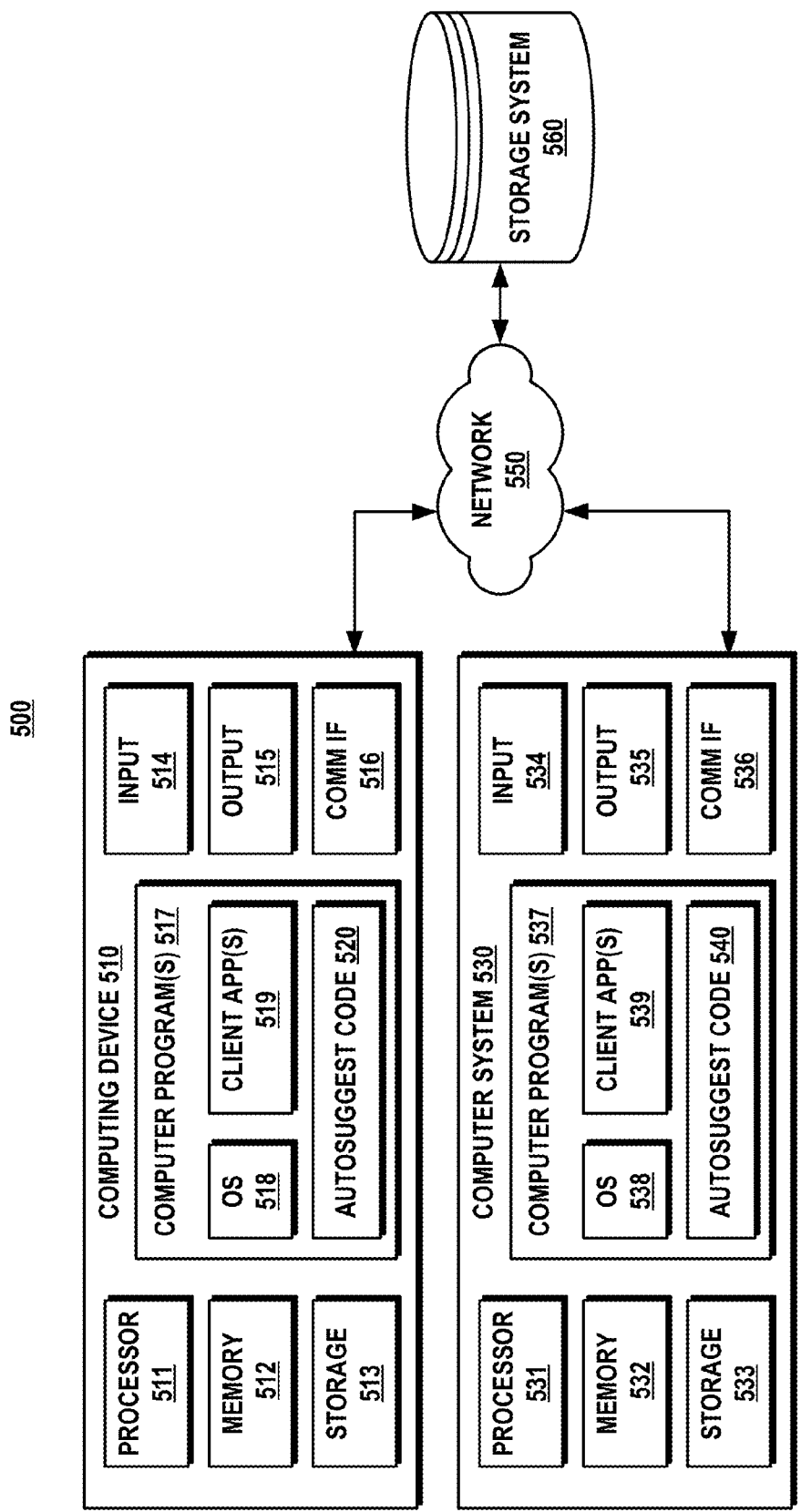
FIG. 5 illustrates an embodiment of an exemplary operating environment that may implement aspects of the described subject matter.

FIG. 5 illustrates an operating environment 500 as an embodiment of an exemplary operating environment that may implement aspects of the described subject matter. It is to be appreciated that operating environment 500 may be implemented by a client-server model and/or architecture as well as by other operating environment models and/or architectures in various embodiments.

Operating environment 500 may include a computing device 510, which may be implement aspects of the described subject matter. Computing device 510 may include a processor 511 and memory 512. Computing device 510 also may include additional hardware storage 513. It is to be understood that computer-readable storage media includes memory 512 and hardware storage 513.

Computing device 510 may include input devices 514 and output devices 515. Input devices 314 may include one or more of the exemplary input devices described above and/or other type of input mechanism and/or device. Output devices 515 may include one or more of the exemplary output devices described above and/or other type of output mechanism and/or device.

Computing device 510 may contain one or more communication interfaces 516 that allow computing device 510 to communicate with other computing devices and/or computer systems. Communication interfaces 516 also may be used in the context of distributing computer-executable instructions.

Computing device 510 may include and/or run one or more computer programs 517 implemented, for example, by software, firmware, hardware, logic, and/or circuitry of computing device 510. Computer programs 517 may include an operating system 518 implemented, for example, by one or more exemplary operating systems described above and/or other type of operating system suitable for running on computing device 510. Computer programs 517 may include one or more applications 519 implemented, for example, by one or more exemplary applications described above and/or other type of application suitable for running on computing device 510.

Computer programs 517 may be configured via one or more suitable interfaces (e.g., API or other data connection) to communicate and/or cooperate with one or more resources. Examples of resources include local computing resources of computing device 510 and/or remote computing resources such as server-hosted resources, cloud-based resources, online resources, remote data stores, remote databases, remote repositories, web services, web sites, web pages, web content, and/or other types of remote resources.

Computer programs 517 may implement computer-executable instructions that are stored in computer-readable storage media such as memory 512 or hardware storage 513, for example. Computer-executable instructions implemented by computer programs 517 may be configured to work in conjunction with, support, and/or enhance one or more of operating system 518 and applications 519. Computer-executable instructions implemented by computer programs 517 also may be configured to provide one or more separate and/or stand-alone services.

Computing device 510 and/or computer programs 517 may implement and/or perform various aspects of the described subject matter. As shown, computing device 510 and/or computer programs 517 may include autosuggest code 520. In various embodiments, autosuggest code 520 may include computer-executable instructions that are stored on a computer-readable storage medium and configured to implement one or more aspects of the described subject matter. By way of example, and without limitation, autosuggest code 520 may be implemented by computing device 510 which, in turn, may be representative of computing device 100. By way of further example, and without limitation, autosuggest code 520 may implement one or more aspects of autosuggest architecture 200, computer-implemented method 300, and/or computer-implemented method 400.

Operating environment 500 may include a computer system 530, which may be implement aspects of the described subject matter. Computer system 530 may be implemented by one or more computing devices such as one or more server computers. Computer system 530 may include a processor 531 and memory 532. Computer system 530 also may include additional hardware storage 533. It is to be understood that computer-readable storage media includes memory 532 and hardware storage 533. Computer system 530 may include input devices 534 and output devices 535. Input devices 534 may include one or more of the exemplary input devices described above and/or other type of input mechanism and/or device. Output devices 535 may include one or more of the exemplary output devices described above and/or other type of output mechanism and/or device.

Computer system 530 may contain one or more communication interfaces 536 that allow computer system 530 to communicate with various computing devices (e.g., computing device 510) and/or other computer systems. Communication interfaces 536 also may be used in the context of distributing computer-executable instructions.

Computer system 530 may include and/or run one or more computer programs 537 implemented, for example, by software, firmware, hardware, logic, and/or circuitry of computer system 530. Computer programs 537 may include an operating system 538 implemented, for example, by one or more exemplary operating systems described above and/or other type of operating system suitable for running on computer system 530. Computer programs 537 may include one or more applications 539 implemented, for example, by one or more exemplary applications described above and/or other type of application suitable for running on computer system 530.

Computer programs 537 may be configured via one or more suitable interfaces (e.g., API or other data connection) to communicate and/or cooperate with one or more resources. Examples of resources include local computing resources of computer system 530 and/or remote computing resources such as server-hosted resources, cloud-based resources, online resources, remote data stores, remote databases, remote repositories, web services, web sites, web pages, web content, and/or other types of remote resources.

Computer programs 537 may implement computer-executable instructions that are stored in computer-readable storage media such as memory 532 or hardware storage 533, for example. Computer-executable instructions implemented by computer programs 537 may be configured to work in conjunction with, support, and/or enhance one or more of operating system 538 and applications 539. Computer-executable instructions implemented by computer programs 537 also may be configured to provide one or more separate and/or stand-alone services.

Computing system 530 and/or computer programs 537 may implement and/or perform various aspects of the described subject matter. As shown, computer system 530 and/or computer programs 537 may include autosuggest code 540. In various embodiments, autosuggest code 540 may include computer-executable instructions that are stored on a computer-readable storage medium and configured to implement one or more aspects of the described subject matter. By way of example, and without limitation, autosuggest code 540 may be implemented by computer system 530 which, in turn, may implement a search engine and/or other service (e.g., cloud-based service) having autosuggest functionality. By way of further example, and without limitation, autosuggest code 540 may implement one or more aspects of autosuggest architecture 200 and/or computer-implemented method 400.

Computing device 510 and computer system 530 may communicate over network 550, which may be implemented by any type of network or combination of networks suitable for providing communication between computing device 510 and computer system 530. Network 550 may include, for example and without limitation: a WAN such as the Internet, a LAN, a private network, a public network, a packet network, a circuit-switched network, a wired network, and/or a wireless network. Computing device 510 and computer system 530 may communicate over network 550 using various communication protocols and/or data types. One or more communication interfaces 516 of computing device 510 and one or more communication interfaces 536 of computer system 530 may by employed in the context of communicating over network 550.

Computing device 510 and/or computer system 540 may communicate with a storage system 560 over network 550. Alternatively or additionally, storage system 560 may be integrated with computing device 510 and/or computer system 530. Storage system 560 may be representative of various types of storage in accordance with the described subject matter. For example, storage system 560 may implement autosuggest dictionary and/or remote resources. Storage system 560 may provide any suitable type of data storage for relational (e.g., SQL) and/or non-relational (e.g., NO-SQL) data using database storage, cloud storage, table storage, blob storage, file storage, queue storage, and/or other suitable type of storage mechanism. Storage system 530 may be implemented by one or more computing devices, such as a computer cluster in a datacenter, by virtual machines, and/or provided as a cloud-based storage service.

Figure 6:
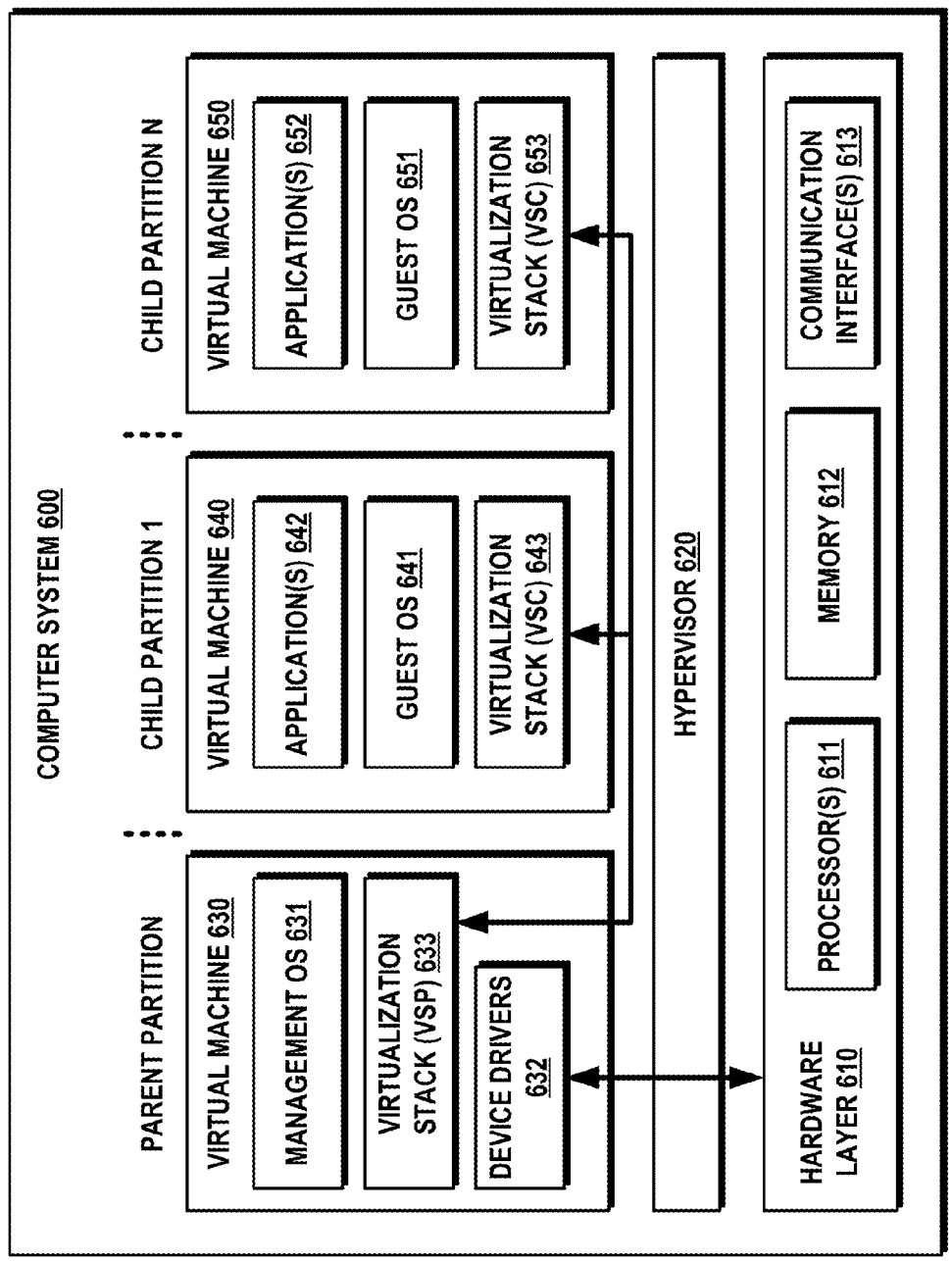
FIG. 6 illustrates an embodiment of an exemplary computer system that may implement aspects of the described subject matter.

FIG. 6 illustrates a computer system 600 as an embodiment of an exemplary computer system that may implement aspects of the described subject matter. In various implementations, deployment of computer system 600 and/or multiple deployments thereof may provide server virtualization for concurrently running multiple virtual servers instances on one physical host server computer and/or network virtualization for concurrently running multiple virtual network infrastructures on the same physical network.

Computer system 600 may be implemented by various computing devices such as one or more physical server computers that provide a hardware layer 610 which may include processor(s) 611, memory 612, and communication interface(s) 613. Computer system 600 may implement a hypervisor 620 configured to manage, control, and/or arbitrate access to hardware layer 610. In various implementations, hypervisor 620 may manage hardware resources to provide isolated execution environments or partitions such a parent (root) partition and one or more child partitions. A parent partition may operate to create one or more child partitions. Each partition may be implemented as an abstract container or logical unit for isolating processor and memory resources managed by hypervisor 620 and may be allocated a set of hardware resources and virtual resources. A logical system may map to a partition, and logical devices may map to virtual devices within the partition.

Parent and child partitions may implement virtual machines such as virtual machines 630, 640, and 650, for example. Each virtual machine may emulate a physical computing device or computer system as a software implementation that executes programs like a physical machine. Each virtual machine can have one or more virtual processors and may provide a virtual system platform for executing an operating system (e.g., a Microsoft® operating system, a Google® operating system, an operating system from Apple®, a Linux® operating system, an open source operating system, etc.). As shown, virtual machine 630 in parent partition may run a management operating system 631, and virtual machines 640, 650 in child partitions may host guest operating systems 641, 651 each implemented, for example, as a full-featured operating system or a special-purpose kernel. Each of guest operating systems 641, 651 can schedule threads to execute on one or more virtual processors and effectuate instances of application(s) 642, 652, respectively.

Virtual machine 630 in parent partition may have access to hardware layer 610 via device drivers 632 and/or other suitable interfaces. Virtual machines 640, 650 in child partitions, however, generally do not have access to hardware layer 610. Rather, such virtual machines 640, 650 are presented with a virtual view of hardware resources and are supported by virtualization services provided by virtual machine 630 in parent partition. Virtual machine 630 in parent partition may host a virtualization stack 633 that provides virtualization management functionality including access to hardware layer 610 via device drivers 632. Virtualization stack 633 may implement and/or operate as a virtualization services provider (VSP) to handle requests from and provide various virtualization services to a virtualization service client (VSC) implemented by one or more virtualization stacks 643, 653 in virtual machines 640, 650 that are operating in child partitions.

Computer system 600 may implement and/or perform various aspects of the described subject matter. By way of example, and without limitation, one or more virtual machines 640, 650 may implement a search engine and/or other service (e.g., cloud-based service) having autosuggest functionality. By way of further example, and without limitation, one or more virtual machines 640, 650 may implement one or more aspects of autosuggest architecture 200 and/or computer-implemented method 400. In addition, hardware layer 610 may be implemented by one or more computing devices of computer system 530.

Figure 7:
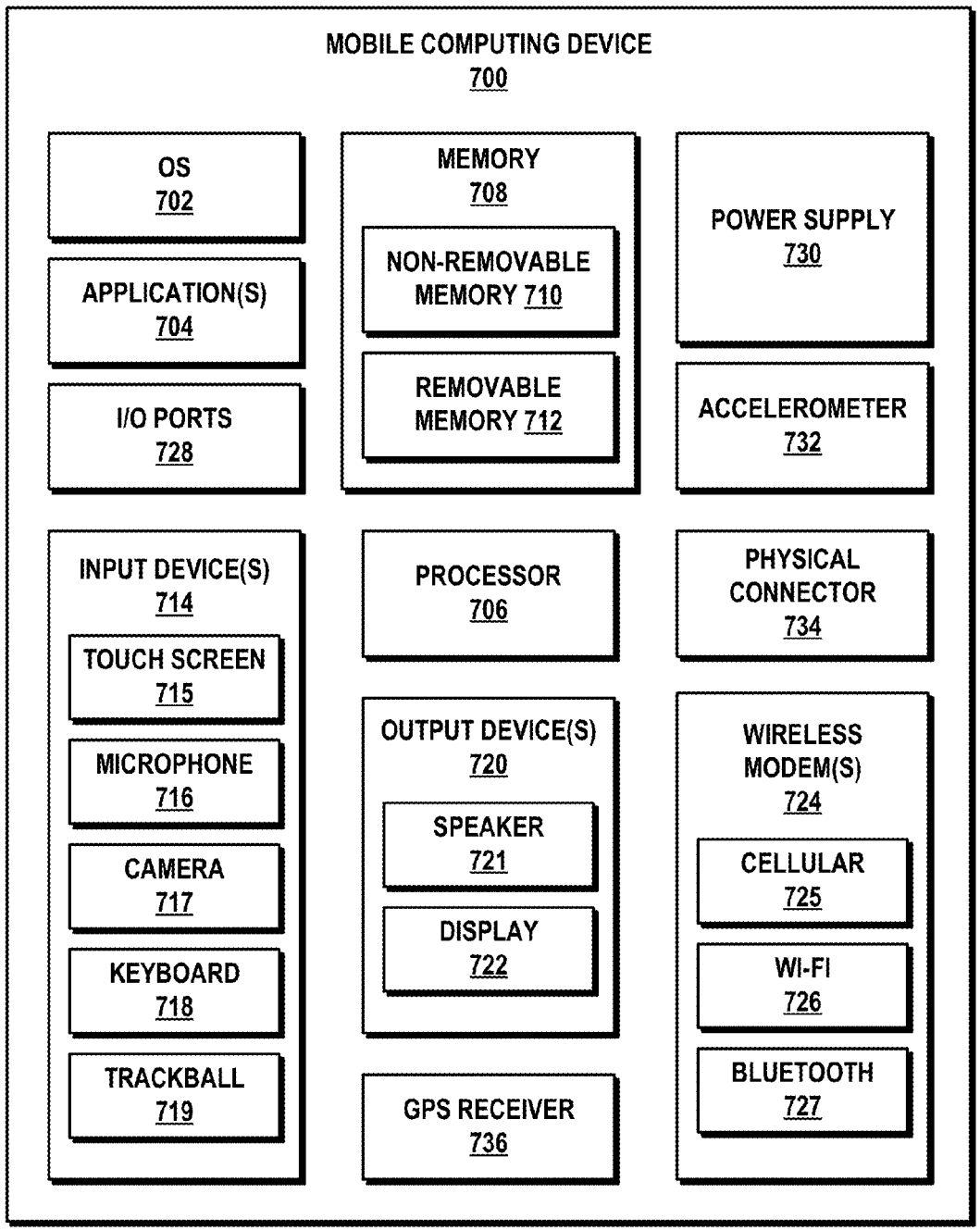
FIG. 7 illustrates an embodiment of an exemplary mobile computing device that may implement aspects of the described subject matter.

FIG. 7 illustrates a mobile computing device 700 as an embodiment of an exemplary mobile computing device that may implement aspects of the described subject matter. In one implementation, mobile computing device 700 may be an example of computing device 100.

As shown, mobile computing device 700 includes a variety of hardware and software components that may communicate with each other. Mobile computing device 700 may represent any of the various types of mobile computing device described herein and can allow wireless two-way communication over a network, such as one or more mobile communications networks (e.g., cellular and/or satellite network), a LAN, and/or a WAN.

Mobile computing device 700 can include an operating system 702 and various types of mobile application(s) 704. In some implementations, mobile application(s) 704 may include one or more client application(s) and/or components of autosuggest architecture 200 such as presentation component 220, truncation component 230, etc.

Mobile computing device 700 can include a processor 706 (e.g., signal processor, microprocessor, ASIC, or other control and processing logic circuitry) for performing tasks such as: signal coding, data processing, input/output processing, power control, and/or other functions.

Mobile computing device 700 can include memory 708 implemented as non-removable memory 710 and/or removable memory 712. Non-removable memory 710 can include RAM, ROM, flash memory, a hard disk, or other memory device. Removable memory 712 can include flash memory, a Subscriber Identity Module (SIM) card, a "smart card" and/or other memory device.

Memory 708 can be used for storing data and/or code for running operating system 702 and/or mobile application(s) 704. Example data can include web pages, text, images, sound files, video data, or other data to be sent to and/or received from one or more network servers or other devices via one or more wired and/or wireless networks. Memory 708 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

Mobile computing device 700 can include and/or support one or more input device(s) 714, such as a touch screen 715, a microphone 716, a camera 717, a keyboard 718, a trackball 719, and other types of input devices (e.g., a Natural User Interface (NUI) device and the like). Touch screen 715 may be implemented, for example, using a capacitive touch screen and/or optical sensors to detect touch input. Mobile computing device 700 can include and/or support one or more output device(s) 720, such as a speaker 721, a display 722, and/or other types of output devices (e.g., piezoelectric or other haptic output devices). In some implementations, touch screen 715 and display 722 can be combined in a single input/output device.

Mobile computing device 700 can include wireless modem(s) 724 that can be coupled to antenna(s) (not shown) and can support two-way communications between processor 706 and external devices. Wireless modem(s) 724 can include a cellular modem 725 for communicating with a mobile communication network and/or other radio-based modems (e.g., Wi-Fi 726 and/or Bluetooth 727). Typically, at least one of wireless modem(s) 724 is configured for: communication with one or more cellular networks, such as a GSM network for data and voice communications within a single cellular network; communication between cellular networks; or communication between mobile computing device 700 and a public switched telephone network (PSTN).

Mobile computing device 700 can further include at least one input/output port 728, a power supply 730, an accelerometer 732, a physical connector 734 (e.g., a USB port, IEEE 1394 (FireWire) port, RS-232 port, and the like), and/or a Global Positioning System (GPS) receiver 736 or other type of a satellite navigation system receiver. It can be appreciated the illustrated components of mobile computing device 700 are not required or all-inclusive, as various components can be omitted and other components can be included in various embodiments.

In various implementations, components of mobile computing device 700 may be configured to perform various operations described in connection with computing device 100. In one example embodiment, computer-executable instructions for performing such operations may be stored in a computer-readable storage medium, such as memory 708 for instance, and may be executed by processor 706.

FIG. 8 illustrates a computing environment 800 as an embodiment of an exemplary computing environment that may implement aspects of the described subject matter. As shown, computing environment 800 includes a general-purpose computing device in the form of a computer 810. In various implementations, computer 810 may be an example of computing device 100, computing device 510, and/or a computing device of computer system 530.

Computer 810 may include various components that include, but are not limited to: a processing unit 820 (e.g., one or processors or type of processing unit), a system memory 830, and a system bus 821 that couples various system components including the system memory 830 to processing unit 820.

System bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

System memory 830 includes computer storage media in the form of volatile and/or nonvolatile memory such as ROM 831 and RAM 832. A basic input/output system (BIOS) 833, containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, an operating system 834, application programs 835, other program modules 836, and program data 837 are shown.

Computer 810 may also include other removable/non-removable and/or volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 841 is typically connected to system bus 821 through a non-removable memory interface such as interface 840, and magnetic disk drive 851 and optical disk drive 855 are typically connected to system bus 821 by a removable memory interface, such as interface 850.

Alternatively, or in addition, the functionality described herein can be performed, at least in part, by one or more hardware logic components. For example, and without limitation, illustrative types of hardware logic components that can be used include FPGAs, PASIC/ASICs, PSSP/ASSPs, a SoC, and CPLDs, for example.

The drives and their associated computer storage media discussed above and illustrated in FIG. 8, provide storage of computer readable instructions, data structures, program modules and other data for the computer 810. For example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a touch screen joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB).

A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

Computer 810 is operated in a networked environment using logical connections to one or more remote computers, such as a remote computer 880. Remote computer 880 may be a personal computer, a hand-held device, a server, a router, a network PC, a peer device or other common network node, and typically includes many or all of the elements described above relative to the computer 810. The logical connections depicted include a local area network (LAN) 871 and a wide area network (WAN) 873, but may also include other networks. Such networking environments are commonplace in offices, enterprise-wide computer networks, intranets and the Internet.

When used in a LAN networking environment, computer 810 is connected to LAN 871 through a network interface or adapter 870. When used in a WAN networking environment, computer 810 typically includes a modem 872 or other means for establishing communications over the WAN 873, such as the Internet. Modem 872, which may be internal or external, may be connected to system bus 821 via user input interface 860, or other appropriate mechanism. In a networked environment, program modules depicted relative to computer 810, or portions thereof, may be stored in a remote memory storage device. By way of example, and not limitation, remote application programs 885 as shown as residing on remote computer 880. It will be appreciated that the network connections shown are exemplary and other means of establishing a communications link between the computers may be used.

Supported Aspects

The detailed description provided above in connection with the appended drawings explicitly describes and supports various aspects in accordance with the described subject matter. By way of illustration and not limitation, supported aspects include a computing device for reducing user error when constructing a search query, the computing device comprising: a processor configured to execute computer-executable instructions; and memory storing computer-executable instructions configured to: display a user interface that includes a search box; display one or more search terms within the search box based on user input; display initial autosuggest candidates; detect a user-selected initial autosuggest candidate; display the user-selected initial autosuggest candidate within the search box as a preliminary search query, without automatically initiating a web search for the preliminary search query; receive new autosuggest candidates having the preliminary search query as a common prefix; generate truncated autosuggest candidates by removing the common prefix from each new autosuggest candidate; and display the truncated autosuggest candidates.

Supported aspects include the forgoing computing device, wherein: the memory further stores computer-executable instructions configured to: detect a user-selected truncated autosuggest candidate; and display a modified search query within in the search box by appending the user-selected truncated autosuggest candidate to the preliminary search query, without automatically initiating a web search for the modified search query.

Supported aspects include any of the forgoing computing devices, wherein the memory further stores computer-executable instructions configured to: receive updated autosuggest candidates having the modified search query as a common prefix; generate truncated autosuggest candidates by removing the common prefix from each updated autosuggest candidate; and append a user-selected truncated autosuggest candidate to the modified search query.

Supported aspects include any of the forgoing computing devices, wherein the memory further stores computer-executable instructions configured to: initiate a web search for a completed search query in response to a touch of a search button, wherein the completed search query is constructed from one or more user-selected truncated autosuggest candidates.

Supported aspects include any of the forgoing computing devices, wherein: the one or more search terms are displayed using Latin characters, and the initial autosuggest candidates include multiple conversions of the one or more search terms into non-Latin characters.

Supported aspects include any of the forgoing computing devices, wherein at least one of the initial autosuggest candidates includes a phrase that is displayed using non-Latin characters and that begins with one of the conversions followed by one or more words.

Supported aspects include any of the forgoing computing devices, wherein: the initial autosuggest candidates are displayed within rows, and one or more the rows include multiple initial autosuggest candidates.

Supported aspects include any of the forgoing computing devices, wherein: the truncated autosuggest candidates are displayed within rows, and one or more the rows include multiple truncated autosuggest candidates.

Supported aspects include any of the forgoing computing devices, wherein: the truncated autosuggest candidates are arranged within the rows based on rank and length.

Supported aspects further include an apparatus, a computer-readable storage medium, a computer-implemented method, and/or means for implementing any of the forgoing computer devices or portions thereof.

Supported aspects include a computer-implemented method for reducing user error when constructing a search query, the computer-implemented method comprising: receiving, by a computing device, a search query without launching a web search for the search query; obtaining, by the computing device, autosuggest candidates having the search query as a common prefix; generating, by the computing device, truncated autosuggest candidates by removing the search query from the autosuggest candidates; and providing the truncated autosuggest candidates for display.

Supported aspects include the forgoing computer-implemented method, wherein the search query is received and presented in a search box of a user interface.

Supported aspects include any of the forgoing computer-implemented methods, wherein the search query includes a transliteration of one or more search terms.

Supported aspects include any of the forgoing computer-implemented methods, wherein the search query includes one or more user-selected truncated autosuggest candidates.

Supported aspects include any of the forgoing computer-implemented methods, wherein the autosuggest candidates are obtained from a suggestion dictionary.

Supported aspects include any of the forgoing computer-implemented methods, wherein: the truncated autosuggest candidates are displayed within rows, and one or more the rows include multiple truncated autosuggest candidates.

Supported aspects include any of the forgoing computer-implemented methods, further comprising: constructing a completed search query from one or more user-selected truncated autosuggest candidates.

Supported aspects include any of the forgoing computer-implemented methods, further comprising: launching a web search for a completed search query constructed from one or more user-selected truncated autosuggest candidates.

Supported aspects further include a system, an apparatus, a computer-readable storage medium, and/or means for implementing and/or performing any of the foregoing computer-implemented methods or portions thereof.

Supported aspects include a computer-readable storage medium storing computer-executable instructions that, when executed by a computing device, cause the computing device to implement a truncation component, wherein the truncation component is configured to: receive autosuggest candidates for a search query from an autosuggest component, the autosuggest candidates having the search query as a common prefix; generate truncated autosuggest candidates by removing the common prefix from the autosuggest candidates; and provide the truncated autosuggest candidates to a presentation component for display.

Supported aspects include the forgoing computer-readable storage medium, further storing computer-executable instructions that implement the presentation component, wherein the presentation component is configured to: interpret Latin keystrokes according to an input method for a non-Latin language; arrange truncated autosuggest candidates based on rank and length; display truncated autosuggest candidates within rows, wherein one or more of the rows include multiple truncated autosuggest candidates; move a user-selected truncated autosuggest candidates to a search box without automatically initiating a web search; and append the user-selected truncated autosuggest candidate to a search query.

Supported aspects include any of the forgoing computer-readable storage media, further storing computer-executable instructions that implement the autosuggest component and a search engine, wherein: the autosuggest component is configured to provide autosuggest candidates that include multiple conversions of a search term into non-Latin characters; and the search engine is configured to provide search results in response to a completed search query constructed from one or more user-selected truncated autosuggest candidates.

It can be appreciated that the supported aspects in accordance with the described embodiments provide various attendant and/or technical advantages. By way of illustration and not limitation, various features and implementations reduce user error when constructing a search query and/or facilitate one-handed operation of a computing device. Presenting the user with numerous and diverse autosuggest candidates during a query input stage encourages the user to construct a search query by making touch selections rather than typing, which is prone to user error. Providing larger touch regions as compared to the small keyboard keys facilitates receiving touch input. Including several rows of autosuggest candidates with one or more rows containing multiple autosuggest candidates increases the likelihood that an autosuggest candidate of interest to the user will be displayed and touched. Suggestion diversity is improved by supporting multiple different languages and/or IME (or IME-like) functionality for mapping Latin, non-Latin, and/or input method characters (e.g., Pinyin characters) to one or multiple translations, conversions, and/or transliterations. Truncated autosuggest candidates provide shorter autosuggest candidates, which facilitates reading and allows a greater number of autosuggest candidates to be displayed.

Various features and implementations enable a user to construct and complete a search query by providing a small amount of keyboard input and making touch selections without further use of the keyboard. Moving user-selected autosuggest candidates to a search box without automatically initiating a web search reduces the likelihood that the user accidentally or prematurely performs a web search before constructing a completed search query and conserves processing resources of a computing device a remote computer system. Moving user-selected autosuggest candidates to a search box when touched also avoids the need to navigate using directional keys, which are not included on virtual keyboards for mobile devices. Autosuggest candidates can be moved to a search box without the use of arrow or plus symbol (+) icons, which are difficult to accurately touch when desired and easy to touch by mistake, especially during one-handed operation of a small touchscreen device.

The detailed description provided above in connection with the appended drawings is intended as a description of examples and is not intended to represent the only forms in which the present examples may be constructed or utilized.

It is to be understood that the configurations and/or approaches described herein are exemplary in nature, and that the described embodiments, implementations and/or examples are not to be considered in a limiting sense, because numerous variations are possible. The specific processes or methods described herein may represent one or more of any number of processing strategies. As such, various operations illustrated and/or described may be performed in the sequence illustrated and/or described, in other sequences, in parallel, or omitted. Likewise, the order of the above-described processes may be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. A computing device for reducing user error when constructing a search query, comprising:
    a processor; and
    a memory storing computer-executable instructions that, when executed by the processor, perform a method, comprising:
        displaying, on the computing device, a user interface that includes a search box;
        receiving input within search box about one or more search terms;
        displaying one or more initial autosuggest candidates based, at least in part, on the input;
        receiving input that selects one of the one or more initial autosuggest candidates;
        displaying the selected one of the one or more initial autosuggest candidates within the search box as a preliminary search query, without automatically initiating a web search for the preliminary search query;
        receiving new autosuggest candidates having the preliminary search query as a common prefix, wherein the new autosuggest candidates are based, at least in part, on received user preference information corresponding to the preliminary search query;
        generating truncated autosuggest candidates by removing the common prefix from each new autosuggest candidate; and
        displaying the truncated autosuggest candidates in the user interface.

2. The computing device of claim 1, further comprising instructions for:
    detecting a selection of a truncated autosuggest candidate; and
    displaying a modified search query within in the search box by appending the truncated autosuggest candidate to the preliminary search query, without automatically initiating a web search for the modified search query.

3. The computing device of claim 2, further comprising instructions for:
    receiving updated autosuggest candidates having the modified search query as a new common prefix;
    generating truncated autosuggest candidates by removing the new common prefix from each updated autosuggest candidate; and
    appending a selected truncated autosuggest candidate to the modified search query.

4. The computing device of claim 2, further comprising instructions for initiating a web search for a completed search query in response to a touch of a search button, wherein the completed search query is constructed from one or more selected truncated autosuggest candidates.

5. The computing device of claim 1, wherein:
    the one or more search terms are displayed using Latin characters, and
    the initial autosuggest candidates include multiple conversions of the one or more search terms into non-Latin characters.

6. The computing device of claim 5, wherein at least one of the initial autosuggest candidates includes a phrase that is displayed using non-Latin characters and that begins with one of the conversions followed by one or more words.

7. The computing device of claim 1, wherein:
    the initial autosuggest candidates are displayed within rows; and
    one or more of the rows include multiple initial autosuggest candidates.

8. The computing device of claim 1, wherein:
    the truncated autosuggest candidates are displayed within rows; and
    one or more of the rows include multiple truncated autosuggest candidates.

9. The computing device of claim 8, wherein the truncated autosuggest candidates are arranged within the rows based, at least in part, on rank and length.

10. A computer-implemented method for reducing user error when constructing a search query, comprising:
    receiving, by a computing device, a search query without launching a web search for the search query;
    obtaining, by the computing device, autosuggest candidates having the search query as a common prefix wherein the autosuggest candidates are based, at least in part, on received user preference information corresponding to the search query;
    generating, by the computing device, truncated autosuggest candidates by removing the search query from the autosuggest candidates; and
    providing the truncated autosuggest candidates for display.

11. The computer-implemented method of claim 10, wherein the search query is received and presented in a search box of a user interface.

12. The computer-implemented method of claim 10, wherein the search query includes a transliteration of one or more search terms.

13. The computer-implemented method of claim 10, wherein the search query includes one or more truncated autosuggest candidates that is selected based, at least in part, on received input.

14. The computer-implemented method of claim 10, wherein the received information is received from a suggestion dictionary.

15. The computer-implemented method of claim 10, wherein:
    the truncated autosuggest candidates are displayed within rows; and
    one or more of the rows include multiple truncated autosuggest candidates.

16. The computer-implemented method of claim 10, further comprising constructing a completed search query from one or more selected truncated autosuggest candidates.

17. The computer-implemented method of claim 10, further comprising launching a web search for a completed search query constructed from one or more selected truncated autosuggest candidates.

18. A computer-readable storage medium storing computer-executable instructions that, when executed by a processor, cause the processor to perform a method, comprising:
receiving autosuggest candidates for a received search query wherein the autosuggest candidates include the search query as a common prefix and wherein the autosuggest candidates are based, at least in part, on received user preference information corresponding to the search query;
generating truncated autosuggest candidates by removing the common prefix from the autosuggest candidates; and
providing the truncated autosuggest candidates for display.

19. The computer-readable storage medium of claim 18, further comprising instructions for:
interpreting Latin keystrokes according to an input method for a non-Latin language;
arranging truncated autosuggest candidates based on rank and length;
displaying truncated autosuggest candidates within rows, wherein one or more of the rows include multiple truncated autosuggest candidates;
moving a user-selected truncated autosuggest candidates to a search box without automatically initiating a web search; and
appending the user-selected truncated autosuggest candidate to a search query.

20. The computer-readable storage medium of claim 18, further comprising instructions for:
providing autosuggest candidates that include multiple conversions of a search term into non-Latin characters; and
providing search results in response to a completed search query constructed from one or more selected truncated autosuggest candidates.

* * * * *